United States Patent
Anderson et al.

(10) Patent No.: US 11,312,131 B2
(45) Date of Patent: Apr. 26, 2022

(54) SENSE MEASUREMENT INDICATORS TO SELECT FLUIDIC ACTUATORS FOR SENSE MEASUREMENTS

(71) Applicant: HEWLETT-PACKARD DEVELOPMENT COMPANY, L.P., Spring, TX (US)

(72) Inventors: Daryl E. Anderson, Corvallis, OR (US); Eric T. Martin, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,822

(22) PCT Filed: Apr. 6, 2018

(86) PCT No.: PCT/US2018/026548
§ 371 (c)(1),
(2) Date: Oct. 8, 2019

(87) PCT Pub. No.: WO2019/194832
PCT Pub. Date: Oct. 10, 2019

(65) Prior Publication Data
US 2021/0283900 A1 Sep. 16, 2021

(51) Int. Cl.
*B41J 2/145* (2006.01)
*B41J 2/045* (2006.01)
(Continued)

(52) U.S. Cl.
CPC .......... *B41J 2/0458* (2013.01); *B29C 64/209* (2017.08); *B29C 64/393* (2017.08); *B33Y 30/00* (2014.12); *B33Y 50/02* (2014.12); *B41J 2/145* (2013.01)

(58) Field of Classification Search
CPC .......... B41J 2/0458; B41J 2/145; B41J 2/175; B29C 64/209; B29C 64/393; B33Y 30/00; B33Y 50/02
See application file for complete search history.

(56) References Cited

U.S. PATENT DOCUMENTS 6,130,683 A 10/2000 Ju
6,257,694 B1 7/2001 Tokumaru et al.
(Continued)

FOREIGN PATENT DOCUMENTS

EP 1413435 A1 4/2004
KR 20090108371 A 10/2009
(Continued)

OTHER PUBLICATIONS

Anderson et al., International Appl. No. PCT/US2018/026543 entitled Decoders to Activate Fluidic Actuators for Sense Measurements filed Apr. 6, 2018 43 pages.
(Continued)

*Primary Examiner* — Lamson D Nguyen
(74) *Attorney, Agent, or Firm* — Trop Pruner & Hu PC

(57) ABSTRACT

In some examples, a fluid dispensing device includes a plurality of fluidic actuators, and a plurality of sense measurement storage elements to store sense measurement indicators for indicating whether sense measurement is to be performed for fluidic actuators of the plurality of fluidic actuators. The fluid dispensing device further includes a controller to control setting of the sense measurement indicators in the sense measurement storage elements to select which fluidic actuator is to be subject to a sense measurement.

18 Claims, 16 Drawing Sheets

(51) Int. Cl.
*B33Y 30/00* (2015.01)
*B33Y 50/02* (2015.01)
*B29C 64/209* (2017.01)
*B29C 64/393* (2017.01)

(56) References Cited

U.S. PATENT DOCUMENTS

| | | |
|---|---|---|
| 6,616,256 B1 | 9/2003 | Cook et al. |
| 7,635,174 B2 | 12/2009 | Bergstedt et al. |
| 8,708,449 B2 | 4/2014 | Shinkawa |
| 8,899,711 B2 | 12/2014 | Masuda et al. |
| 9,493,002 B2 | 11/2016 | Edelen et al. |
| 9,776,395 B2 | 10/2017 | Anderson et al. |
| 2006/0125858 A1 | 6/2006 | Silverbrook et al. |
| 2008/0084444 A1 | 4/2008 | Sheahan et al. |
| 2010/0231625 A1 | 9/2010 | Walmsley et al. |
| 2011/0084997 A1 | 4/2011 | Chen et al. |
| 2013/0278656 A1 | 10/2013 | Govyadinov et al. |
| 2013/0278657 A1 | 10/2013 | Martin et al. |
| 2014/0210881 A1 | 7/2014 | Brocklin et al. |
| 2017/0225455 A1 | 8/2017 | Veenstra et al. |

FOREIGN PATENT DOCUMENTS

| | | |
|---|---|---|
| WO | WO2011146145 A1 | 11/2011 |
| WO | WO2014046687 A1 | 3/2014 |
| WO | WO2015116068 A1 | 8/2015 |

OTHER PUBLICATIONS

Anderson et al., International Appl. No. PCT/US2018/026546 entitled Fluidic Actuator Activations for Sense Measurements filed Apr. 6, 2018 (40 pages).

Martin et al., International Appl. No. PCT/US2018/026541 entitled Sense Measurements for Fluidic Actuators filed Apr. 6, 2018 (33 pages).

Martin et al., International Appl. No. PCT/US2018/026552 entitled Reference Measurements of Fluidic Actuators filed Apr. 6, 2018 (47 pages).

SENSE MEASUREMENT INDICATORS TO SELECT FLUIDIC ACTUATORS FOR SENSE MEASUREMENTS

BACKGROUND

A fluid dispensing system can dispense fluid towards a target. In some examples, a fluid dispensing system can include a printing system, such as a two-dimensional (2D) printing system or a three-dimensional (3D) printing system. A printing system can include printhead devices that include fluidic actuators to cause dispensing of printing fluids.

BRIEF DESCRIPTION OF THE DRAWINGS

Some implementations of the present disclosure are described with respect to the following figures.

Figure 1:
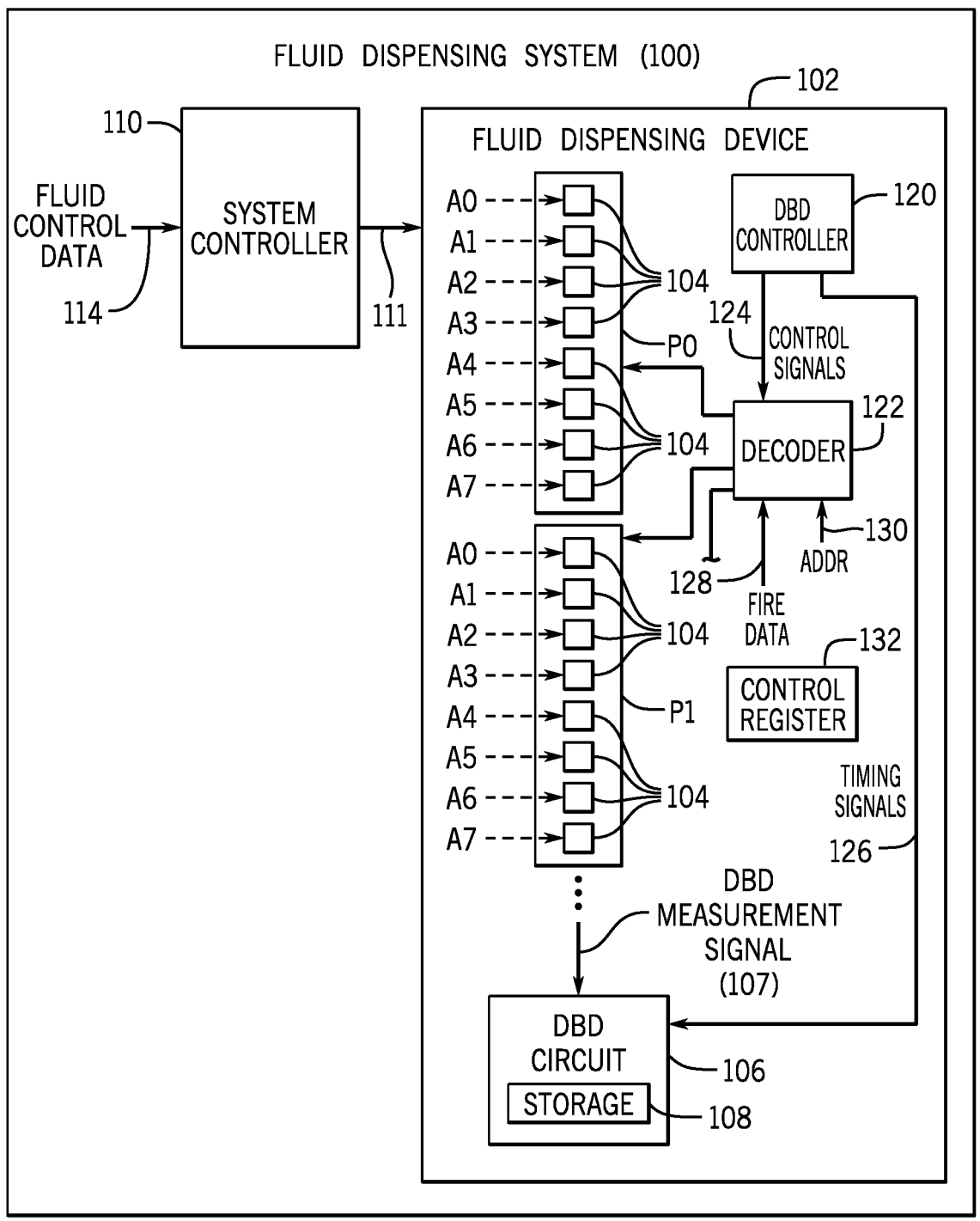
FIG. 1 is a block diagram of a fluid dispensing system including a system controller and a fluid dispensing device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A fluid dispensing device can include fluidic actuators that when activated cause dispensing (e.g., ejection or other flow) of a fluid. For example, the dispensing of the fluid can include ejection of fluid droplets by activated fluidic actuators from respective nozzles of the fluid dispensing device. In other examples, an activated fluidic actuator (such as a pump) can cause fluid to flow through a fluid conduit or fluid chamber. Activating a fluidic actuator to dispense fluid can thus refer to activating the fluidic actuator to eject fluid from a nozzle or activating the fluidic actuator to cause a flow of fluid through a flow structure, such as a flow conduit, a fluid chamber, and so forth.

Generally, a fluidic actuator can be an ejecting-type fluidic actuator to cause ejection of a fluid, such as through an orifice of a nozzle, or a non-ejecting-type fluidic actuator to cause flow of a fluid.

Activating a fluidic actuator can also be referred to as firing the fluidic actuator. In some examples, the fluidic actuators include thermal-based fluidic actuators including heating elements, such as resistive heaters. When a heating element is activated, the heating element produces heat that can cause vaporization of a fluid to cause nucleation of a vapor bubble (e.g., a steam bubble) proximate the thermal-based fluidic actuator that in turn causes dispensing of a quantity of fluid, such as ejection from an orifice of a nozzle or flow through a fluid conduit or fluid chamber. In other examples, a fluidic actuator may be a piezoelectric membrane based fluidic actuator that when activated applies a mechanical force to dispense a quantity of fluid.

In examples where a fluid dispensing device includes nozzles, each nozzle includes a fluid chamber, also referred to as a firing chamber. In addition, a nozzle can include an orifice through which fluid is dispensed, a fluidic actuator, and a sensor. Each fluid chamber provides the fluid to be dispensed by the respective nozzle. Prior to a droplet release, the fluid in the fluid chamber is restrained from exiting the nozzle due to capillary forces and/or back-pressure acting on the fluid within the nozzle passage.

During a droplet release from a nozzle, the fluid within the fluid chamber is forced out of the nozzle by actively increasing the pressure within the fluid chamber. In some example fluid dispensing devices, a resistive heater positioned within the fluid chamber when activated vaporizes a small amount of at least one component of the fluid. In some cases, a major component of the fluid (such as liquid ink for printing systems or other types of fluids) is water, and the resistive heater vaporizes the water. The vaporized fluid component expands to form a gaseous drive bubble within the fluid chamber. This expansion exceeds a restraining force on the fluid within the fluid chamber enough to expel a quantity of fluid (a single fluid droplet or multiple fluid droplets) out of the nozzle. Generally, after the release of fluid droplet, the pressure in the fluid chamber drops below the strength of the restraining force and the remainder of the fluid is retained within the fluid chamber. Meanwhile, the drive bubble collapses and fluid from a reservoir for the fluid dispensing device flows into the fluid chamber to replenish the lost fluid volume resulting from the fluid droplet release. The foregoing process is repeated each time the nozzle of the fluid dispensing device is instructed to fire.

In other examples with non-ejecting fluidic actuators, the drive bubble formed by activation of a non-ejecting fluidic actuator causes movement of fluid through a fluid conduit or fluid chamber.

After repeated use of the fluidic actuators of a fluid dispensing device, the fluidic actuators or flow structures associated with the fluidic actuators may develop defects (e.g., a nozzle, fluid conduit, or fluid chamber may become clogged, a fluidic actuator may malfunction, etc.) and hence may not operate in a target manner. As a result, fluid dispensing performance of the fluidic actuators may degrade over time and use.

In some examples, fluidic actuator health can be determined by performing drive bubble detection (DBD) measurements for each fluidic actuator. DBD measurements can allow for detection of characteristics of a drive bubble and a fluid in a fluid chamber or fluid channel. From these characteristics, qualities of the drop ejected or fluid moved can be inferred, so that servicing or replacement of a degraded fluid dispensing device can be performed.

Although reference is made to DBD measurements in some examples, it is noted that techniques or mechanisms according to some implementations of the present disclosure can also be applied to other types of sense measurements of fluidic actuators. A sense measurement of a fluidic actuator refers to measuring a characteristic of the fluidic actuator and/or flow structure associated with the fluidic actuator for determining a condition of the fluidic actuator and/or flow structure.

A fire event can refer to a signal or other indication that is provided to activate a fluidic actuator. A fire event to activate a fluidic actuator can refer to a fire event to activate a single fluidic actuator or a group of fluidic actuators. In some examples, a DBD measurement for a fluidic actuator is performed in response to a fire event. In some cases, to obtain multiple DBD measurements for a fluidic actuator, the fluidic actuator can be fired multiple times in response to respective multiple fire events.

In some examples, activating a fluidic actuator to perform a DBD measurement can cause ejection of a fluid droplet from a corresponding nozzle or cause other dispensing of an amount of fluid, which can lead to increased fluid usage. Also, in printing applications, ejection of a fluid droplet during a sense measurement can lead to the fluid droplet being deposited onto a print medium or other print target, which may be undesirable since the fluid droplet can cause a noticeable artifact on the print medium or other print target.

In accordance with some implementations of the present disclosure, extra ejection or flow of fluid from nozzles or other flow structures subject to sense measurements (e.g., DBD measurements) can be suppressed by providing circuitry as part of a fluid dispensing device (e.g., a fluidic die) to detect that a given fluidic actuator is to be activated, detect that a sense measurement is to be performed, and in response to detecting that the given fluidic actuator is to be activated and the sense measurement is to be performed: suppress activation of the given fluidic actuator at a given time, and activate the given fluidic actuator at a different time corresponding to a sense measurement interval to perform the sense measurement of the given fluidic actuator.

The detection that a sense measurement is to be performed can be based on sense measurement indicators stored in sense measurement storage elements associated with respective fluidic actuators or groups of fluidic actuators (a group of fluidic actuators can also be referred to as a "primitive") in a fluid dispensing device. Within a given array (e.g., column) of fluidic actuators, just one fluidic actuator (or some specified number of fluidic actuators) can be selected for sense measurement using the sense measurement indicators stored in the sense measurement storage elements. Re-populating (re-loading) the entire set of sense measurement storage elements with new values of sense measurement indicators on each successive sense measurement iteration, may be inefficient. In accordance with some implementations of the present disclosure, instead of re-populating the entire set of sense measurement storage elements on each successive sense measurement iteration, a controller controls setting of the sense measurement indicators in the sense measurement storage elements by shifting a sense select indicator through a chain of sense measurement storage elements.

In some examples, the controller can be implemented as part of the fluid dispensing device. In other examples, the controller can be separate from and external of the fluid dispensing device—for example, the controller can be part of a fluid dispensing system (e.g., a printing system) in which the fluid dispensing device is installed.

As used here, a "controller" can refer to a hardware processing circuit or a combination of a hardware processing circuit and machine-readable instructions executable on the hardware processing circuit. A hardware processing circuit can include any or some combination of the following: a microprocessor, a core of a multi-core microprocessor, a microcontroller, a programmable integrated circuit, a programmable gate array, or another hardware processing circuit.

FIG. 1 is a block diagram of a fluid dispensing system 100, according to some examples. The fluid dispending system 100 can be a printing system, such as a 2D printing system or a 3D printing system. In other examples, the fluid dispending system 100 can be a different type of fluid dispensing system. Examples of other types of fluid dispensing systems include those used in fluid sensing systems, medical systems, vehicles, fluid flow control systems, and so forth.

The fluid dispensing system 100 includes a fluid dispensing device 102 for dispensing fluid. In a 2D printing system, the fluid dispensing device 102 includes a printhead that ejects printing fluid (e.g., ink) onto a print medium, such as a paper medium, a plastic medium, and so forth.

In a 3D printing system, the fluid dispensing device 102 includes a printhead that can eject any of various different printing fluids onto a print target, where the printing fluids can include any or some combination of the following: ink, an agent used to fuse powders of a layer of build material, an agent to detail a layer of build material (such as by defining edges or shapes of the layer of build material), and so forth. In a 3D printing system, a 3D target is built by depositing successive layers of build material onto a build platform of the 3D printing system. Each layer of build material can be processed using the printing fluid from a printhead to form the desired shape, texture, and/or other characteristic of the layer of build material.

In some examples, the fluid dispensing device 102 can be a fluid dispensing die. A "die" refers to an assembly where various layers are formed onto a substrate to fabricate circuitry, fluid chambers, and fluid conduits.

The fluid dispensing device 102 includes an array of fluidic actuators 104. The array of fluidic actuators 104 can include a column of fluidic actuators, or multiple columns of fluidic actuators. The fluidic actuators 104 can be organized into multiple primitives, where each primitive includes a specified number of fluidic actuators. FIG. 1 shows primitives P0 and P1. Each primitive P0 or P1 includes 8 fluidic actuators. In other examples, a primitive can include a different number of fluidic actuators. Also, the array of fluidic actuators 104 can include more than two primitives.

The fluidic actuators 104 can be part of nozzles or can be associated with other types of flow structures, such as fluid conduits, fluid chambers, and so forth. Each fluidic actuator is selected by a respective different address. Thus, in the example of FIG. 1, the fluidic actuators in the nozzles of the primitive P0 are selected by respective addresses A0-A7, and similarly, the fluidic actuators in the nozzles of the primitive P1 are selected by respective addresses A0-A7.

In some examples, fluidic and electrical constraints can prevent firing of all of the fluidic actuators 104 simultaneously. To fire all the fluidic actuators, data (e.g., in the form of a first data packet) is loaded to activate all fluidic actuators in the primitives for a first address (e.g., A0), then data (e.g., in the form of a second data packet) is loaded to activate all fluidic actuators selected by a second address (e.g., A1), and so forth.

In some examples, fire data (also referred to as "activate data") to control activation or non-activation of a fluidic actuator in each primitive can be loaded in one of several ways. A first way is to load fire data (for activating a fluidic actuator) on a per-primitive basis, and a second way is to load fire data on a per-fluidic actuator basis. In some examples, loading the fire data on a per-primitive basis refers to loading fire data for each primitive and supplying an address for each primitive, where the fire data loaded for a respective primitive is used for activating just a single fluidic actuator of the respective primitive in each activation interval. More specifically, a unique fire data bit (or fire data bits) is loaded for each respective primitive, and a single address is supplied to groups of primitives. In each successive activation interval, fire data for a successively different fluidic actuator is loaded for each primitive. In some examples, the activation intervals are referred to as fire pulse groups (FPGs). A set of FPGs, including one FPG for each address, is referred to as a column group. The fire data loaded in each FPG (or more generally, each activation interval) can be in the form of a data packet.

More generally, a column group is referred to as a group of activation intervals or cycles that correspond to different addresses (e.g., A0-A7). In the example of FIG. 1, the 8 fluidic actuators of each primitive can be activated in the respective 8 FPGs of a column group (or more generally, the respective 8 activation intervals of a group of activation intervals).

In some examples, the loading of fire data on a per-primitive basis is performed in a fluid dispensing device that has an FPG arrangement, i.e., an arrangement where for each primitive, successive fluidic actuators of a primitive are activated in respective activation intervals with fire data loaded in each respective activation interval.

As noted above, another way of loading fire data is to load fire data on a per-fluidic actuator basis. In some examples, loading fire data on a per-fluidic actuator basis is performed for a fluid dispensing device that has a full column buffer (FCB) arrangement. In the FCB arrangement, fire data is loaded for all fluidic actuators in an array of fluidic actuators (e.g., column of fluidic actuators). As a result, fire data does not have to be loaded on each successive activation interval of multiple activation intervals for activating fluidic actuators of a primitive. Rather, since the fire data has been loaded for all fluidic actuators of the array of fluidic actuators, such loaded fire data for the individual fluidic actuators can be used to control activation of respective fluidic actuators. Once fire data has been loaded for all fluidic actuators, fire pulses and address data are provided to all primitives (i.e., for an 8-address primitive, 8 fire pulses, each with a unique address, are sent before the next FCB data packet is loaded).

In accordance with some implementations of the present disclosure, as shown in FIG. 1, the fluid dispensing device 102 further includes a DBD controller 120 and a decoder 122 that is used to control activation of fluidic actuators 104, where the activation of a fluid actuator can be a normal activation of the fluid actuator or a sense measurement activation of the fluid actuator to perform a sense measurement.

The decoder 122 can refer to a hardware processing circuit or a combination of a hardware processing circuit and machine-readable instructions executable on the hardware processing circuit.

A "normal activation" of a fluidic actuator refers to activating the fluidic actuator in a scheduled activation interval, as scheduled by a system controller 110 of the fluid dispensing system 100. A "sense measurement" activation of a fluidic actuator refers to activating the fluidic actuator in a sense measurement interval that is shifted in time from a scheduled activation interval (also referred to as a "normal activation interval").

The DBD controller 120 provides control signals 124 to control the operation of the decoder 122. Further details regarding the control signals 124 are provided below. The DBD controller 120 also provides timing signals 126 to a DBD circuit 106.

The DBD circuit 106 can receive a DBD measurement signal 107 output by a sensor (that is associated with an activated fluidic actuator) of a nozzle (or other flow structure) that is subjected to a DBD measurement. In examples where the fluid dispensing device 102 includes nozzles, the nozzles can include respective sensors. In other examples, the sensors can be included in other flow structures through which fluid can be dispensed by activations of respective fluidic actuators.

A sensor includes a fluid property sensor to measure a fluid property of the nozzle or other flow structure. The sensor can measure a fluid property concurrent with activation of an associated fluidic actuator. In examples where a fluidic actuator is a thermal based fluidic actuator, the sensor can be used (via sense circuits) to sense a fluid property during formation and collapse of a vapor bubble.

In other examples where the fluidic actuator is a piezoelectric membrane based fluidic actuator, the sensor may be used (via sense circuits) to sense a fluid property during actuation of the piezoelectric membrane that causes ejection or other movement of a quantity of fluid.

In some examples, a sensor can include an impedance sensor to measure variations in the impedance associated with a nozzle or other flow structure due to formation of a drive bubble. In other examples, other types of sensors can be used to measure characteristics of the nozzle or other flow structure due to formation of a drive bubble.

In an example, if a first fluidic actuator of the primitive P0 (which can be any of the fluidic actuators selected by addresses A0-A7) is the subject of a DBD measurement, then the DBD circuit 106 receives the DBD measurement signal 107 from the sensor associated with the first fluidic actuator of the primitive P0. Similarly, if a second fluidic actuator of the primitive P1 (which can be any of the fluidic actuators selected by addresses A0-A7) is the subject of a DBD measurement, then the DBD circuit 106 receives the DBD measurement signal 107 from the sensor associated with the second fluidic actuator in the primitive P1.

In some examples, just one fluidic actuator is selected per array of fluidic actuators 104 for performing a DBD measurement. In other examples, more than one fluidic actuator can be selected for DBD measurement in an array of fluidic actuators 104.

The DBD circuit 106 includes a storage 108 to store a value corresponding to the DBD measurement signal 107 received from the sensor associated with the fluidic actuator that is subject to the DBD measurement. The storage 108 can be a memory, a storage capacitor, a latch, a register, or any other type of storage element.

The storage 108 can store an analog signal corresponding to the DBD measurement signal 107, or a digital value based on the DBD measurement signal 107. To produce a digital value, for example, the DBD circuit 106 can include a comparator (not shown) to compare the DBD measurement signal 107 from a sensor of a nozzle that is the subject of a DBD measurement, to a specified threshold. The output of the comparator can then be provided to an analog-to-digital (ADC) converter to convert into a digital value that can be stored in the storage 108. In other examples, other ways of producing a digital value based on the DBD measurement signal 107 can be performed.

The timing at which the DBD measurement signal 106 is processed and stored by the DBD circuit 106 is controlled by the timing signals 126 from the DBD controller 120.

The fluid dispensing system 100 also includes the system controller 110 (which is separate from the fluid dispensing device 102) that can control the operation of the fluidic actuators 104 of the fluid dispensing device 102.

The system controller 110 receives fluid control data 114, which controls (schedules) which of the fluidic actuators of the array of fluidic actuators 104 of the fluid dispensing device 102 are to be activated (and which other fluidic actuators are to remain inactive). In a printing system, the fluid control data 114 includes image data that schedules the dispensing of fluid from nozzles in forming an image on a print medium (for 2D printing) or in forming a 3D object (for 3D printing) during a print operation. Alternatively, the fluid control data 114 can schedule the activation of pumps or other fluidic actuators to cause flow of a fluid, such as to distribute pigment particles and so forth.

The system controller 110 provides controller activation data 111 (which may include fire data and address data, among other things like DBD control data) to the fluid dispensing device 102. A data controller (not shown) on the fluid dispensing device 102 processes the received controller activation data 111 and extracts fire data 128 and address signals 130 that are provided to various groups of primitives, to select and control activation of the fluidic actuators 104 in respective activation intervals. In addition, the DBD controller 120 can extract sense measurement select data (e.g., DBD select data) from the DBD control data in the controller activation data 111.

The fluid dispensing device 102 further includes a control register 132 that can be programmed by the system controller 110 of the fluid dispensing device 100. The control register 132 can be programmed with various values to control various operational aspects of the fluid dispensing device 102.

In some examples of the present disclosure, the system controller 110 can program a value into the control register 132 to control the shifting of sense measurement indicators in a chain of sense measurement storage elements (explained further below).

Figure 2:
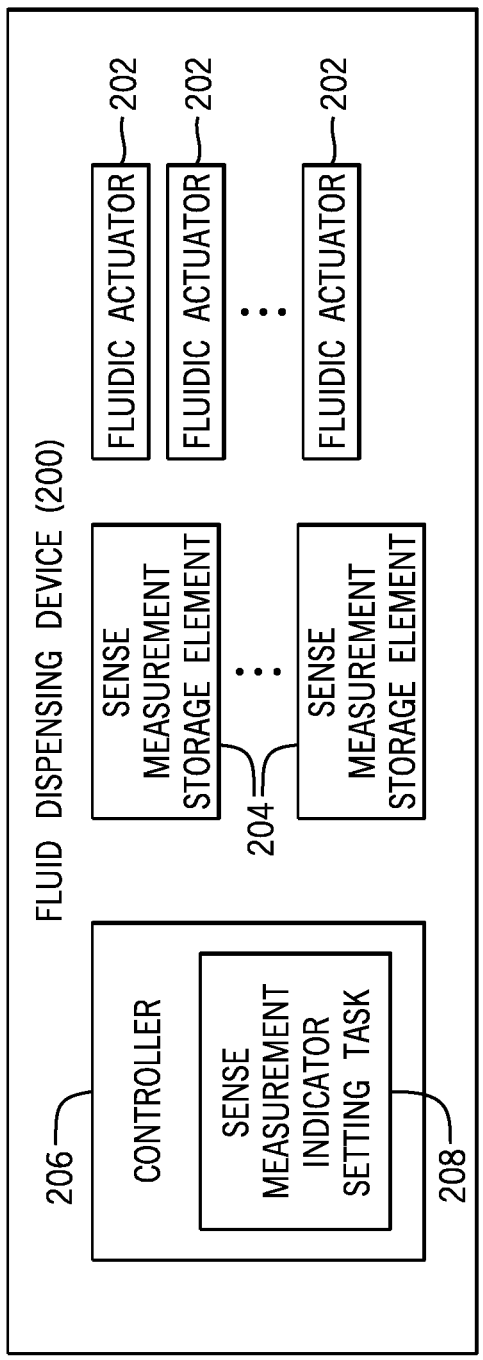
FIG. 2 is a block diagram of a fluid dispensing device according to further examples.

FIG. 2 is a block diagram of a fluid dispensing device 200 (e.g., a fluidic die). The fluid dispensing device 102 of FIG. 1 is an example of the fluid dispensing device 200 of FIG. 2. The fluid dispensing device 200 includes a plurality of fluidic actuators 202 and a plurality of sense measurement storage elements 204 to store sense measurement indicators for indicating whether sense measurement is to be performed for fluidic actuators of the plurality of fluidic actuators 202.

In the FPG arrangement, each sense measurement storage element 204 is associated with a primitive of fluidic actuators. In the FCB arrangement, each sense measurement storage element 204 is associated with an individual fluidic actuator 202.

The fluid dispensing device 200 further includes a controller 206 (e.g., the DBD controller 120 of FIG. 1) to perform a sense measurement indicator setting task 208 that includes controlling a setting of the sense measurement indicators in the sense measurement storage elements 204 to select which fluidic actuator(s) is to be subject to a sense measurement.

In some implementations, the sense measurement storage elements 204 are arranged as a chain of sense measurement storage elements 204. The controller 206 controls the setting of the sense measurement indicators in the sense measurement storage elements 204 by shifting a sense select indicator through the chain of sense measurement storage elements 204. The shifting of the sense select indicator can be performed in any of a number of different ways (discussed further below).

A "sense select indicator" can include a value (represented by a bit or a group of bits) that controls values of the sense measurement indicators in the sense measurement storage elements 204 as the sense select indicator is shifted through the chain. For example, the sense select indicator is set to an active value (e.g., "1") by the controller 206, and the active value of the sense select indicator is shifted through the chain of sense measurement storage elements 204 to successively select different fluidic actuators for sense measurement in successive different sense measurement iterations.

Although FIG. 2 shows the sense measurement indicator setting task 208 being performed by the controller 206 that is part of the fluid dispensing device 200, in other examples, the sense measurement indicator setting task 208 can be performed by a controller separate from and external from the fluid dispensing device 200, such as the system controller 110 of FIG. 1.

Figure 3:
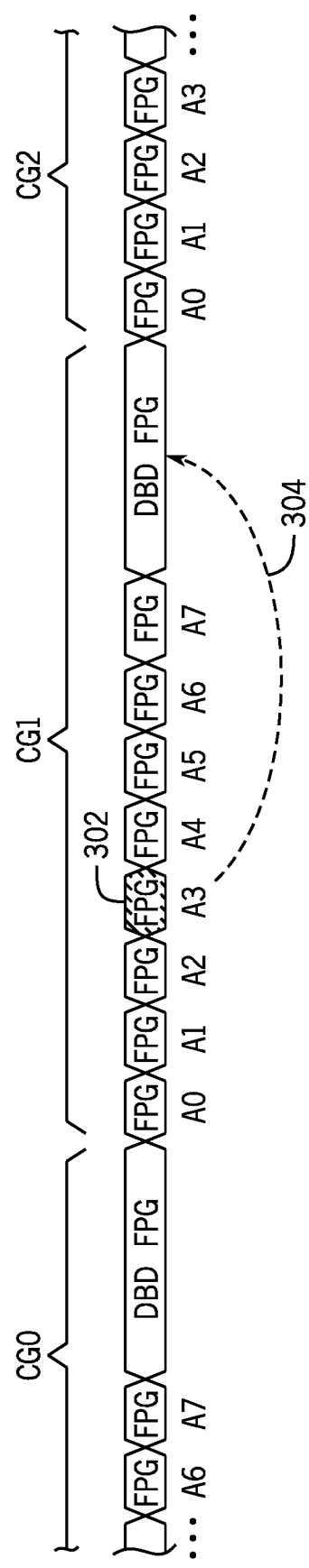
FIG. 3 is a timing diagram illustrating groups of activation intervals, with each group of activation intervals including a sense measurement interval according some examples.

FIG. 3 is a timing diagram that shows multiple column groups CG0, CG1, and CG2. As noted above, each column group includes a sequence of FPGs (assuming that the fluid dispensing device 102 has an FPG arrangement). The sequence of FPGs in a column group includes multiple FPGs that corresponding to respective addresses A0-A7. Such FPGs can be referred to as "normal FPGs" since respective fluidic actuators are selected for activation based on the fluid control data 114 in these FPGs. The series of FPGs in each column group further includes a DBD FPG, which is used to activate a fluidic actuator that is the subject of a DBD measurement. The DBD FPG is an extra FPG added to a column group in addition to the normal FPGs that correspond to addresses A0-A7.

If the fluid dispensing device 102 has an FCB arrangement, then the timing diagram of FIG. 3 can be modified to show each column group as having a sequence of activation intervals.

For the column group CG1, 8 normal FPGs are used to activate 8 respective fluidic actuators of a respective primitive (e.g., primitive P1 in FIG. 1) using respective different addresses A0-A7 (assuming the fluid control data 114 specifies that the fluidic actuators of CG1 are to be activated). The column group CG1 further includes a DBD FPG at the end of the 8 normal FPGs.

Primitive data (also referred to as "fire data") to control activation or non-activation of fluidic actuators is provided in each FPG to each primitive of the multiple primitives. The address sent with a FPG determines which fluidic actuator in each primitive is conditionally fired depending on the state of that primitive's fire data. So if, for example, the fluid control data 114 specifies that the fluidic actuator corresponding to address A3 in primitive P2 is to be fired, then during FPG 302 (corresponding to address A3), the fire data for primitive P2 is set active to enable activation of the fluidic actuator corresponding to address A3 in primitive P2.

Generally, a fluidic actuator activates if a) the fluidic actuator's fire data is set active, and b) if the current address matches that of the fluidic actuator's assigned address. A given fluidic actuator in a particular primitive is not activated, if in a current FPG of a column group, either the fire data for the particular primitive is set inactive or a current address for the current FPG does not match the address of the given fluidic actuator.

Although FIG. 3 shows a DBD FPG as having a length larger than that of a normal FPG, it is noted that the longer depicted length of the DBD FPG is used to represent the fact that a DBD measurement process activates a fluidic actuator, waits a specified amount of time, and samples a measurement signal from the sensor associated with the fluidic actuator. In actuality, the DBD FPG may have a time length that is the same as or similar to the time length of a normal FPG.

In the example of FIG. 3, it is assumed that the fluid control data 114 has selected a fluidic actuator in a particular primitive (hereinafter referred to as the "selected fluidic actuator") corresponding to normal FPG 302 (address A3) in the column group CG1 for activation, and further, that the DBD controller 120 has decided (such as in response to a command from the system controller 110) to perform a DBD measurement of the selected fluidic actuator in the column group CG1. This selected fluidic actuator is also referred to as the A3 selected fluidic actuator, since the fluidic actuator is in the particular primitive (fire data for the particular primitive is set active) and is to be activated by address A3 in the corresponding normal FPG 302.

In a normal operation (i.e., an operation where DBD measurement is not being performed for the column group CG1), the A3 selected fluidic actuator in the column group CG1 would be actuated in the normal FPG 302. However, in accordance with some implementations of the present disclosure, instead of activating the A3 selected fluidic actuator in the normal FPG 302, the selected fluidic actuator is instead activated in the DBD FPG of the column group CG1 to perform a DBD measurement. Effectively, the activation of the selected fluidic actuator has been time shifted (as indicated by 304) from the normal FPG 302 (which is the FPG when the selected fluidic actuator would normally be activated) to the DBD FPG of the column group CG1.

The shifting (304) of the activation of the selected fluidic actuator is performed by a) suppressing activation of the selected fluidic actuator in the normal FPG 302, which is accomplished by the decoder 122 disabling fluidic actuator in the normal FPG 302 (described in further detail in connection with FIG. 4 below), and b) the decoder 122 enabling activation of the selected fluidic actuator in the DBD FPG of the column group CG1 (described in further detail in connection with FIG. 4 below).

In FIG. 3, the shifting (304) of the activation of the selected fluidic actuator for the DBD measurement delays the activation of the selected fluidic actuator. In other examples, if the DBD FPG is placed earlier in the series of FPGs of the column group CG1 than the normal FPG 302, then the shifting (304) causes an earlier activation of the selected fluidic actuator to perform the DBD measurement.

In accordance with some implementations of the present disclosure, a selected fluidic actuator that is to be subject to a DBD measurement is chosen to be one that is already scheduled to fire in one of the normal FPGs corresponding to addresses A0-A7. However, by shifting the activation of the selected fluidic actuator, the selected fluidic actuator is not activated in the corresponding normal FPG, but instead is re-scheduled to be activated in the DBD FPG. Note that the selected fluidic actuator is still activated in the same column group that the selected fluidic actuator is set to be fired based on the fluid control data 114. The activation of the selected fluidic actuator is merely shifted by some amount of time relative to when the selected fluidic actuator was originally scheduled to be activated.

Figure 4:
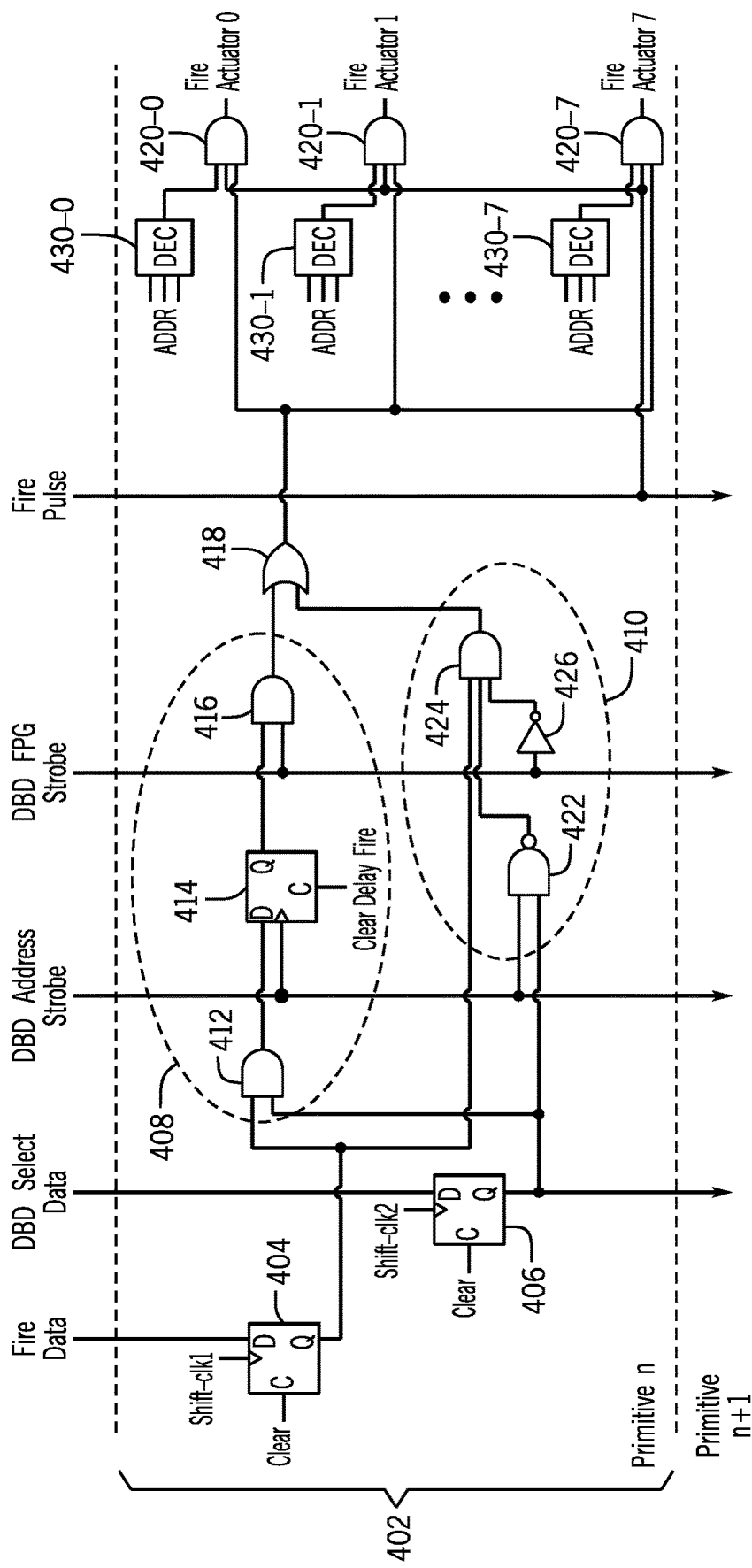
FIGS. 4 and 5 are schematic diagrams of decoders according to various examples.

FIG. 4 is a block diagram of components of an example of a portion 402 of the decoder 122. The decoder portion 402 shown in FIG. 4 is for a fluid dispensing device 102 that is according to the FPG arrangement noted above. Although specific gates (in the form of AND, OR, and NAND gates, inverters, and flip-flops) are shown implementing the decoder 122, it is noted that in other examples, similar logic can be implemented with other types of circuitry, such as an ASIC, PGA, and so forth. More generally, a "logic gate" as used herein can refer to an individual gate (e.g., an AND gate, an OR gate, an inverter, a NAND gate, etc.) or a combination of gates or any other circuitry used to implement a logic functionality.

The decoder portion 402 controls activation of fluidic actuators of an individual primitive (primitive n) of the fluid dispensing device 102. The same decoder portion 402 is repeated for each of the other primitives of the fluid dispensing device 102.

The decoder portion 402 includes a storage element 404 to store the fire data for a fluidic actuator of primitive n. In some examples, the storage element 404 can be in the form of a flip-flop (referred to as a "fire data flip-flop"), which stores data received at the D input on a transition of a clock (Shift-Clk1) that is provided to a clock input of the fire data flip-flop 404. A Clear signal is connected to a C input of the fire data flip-flop 404, and is used to clear the flip-flop 404 to an initial state (e.g., 0), and the output of the flip-flop 404 is represented as a Q output. The Shift-Clk1 and Clear signals are part of the control signals 124 from the DBD controller 120 of FIG. 1. The Clear signal can be activated by the DBD controller 120 to clear fire data from the fire data flip-flops 404. In other examples, the Clear signal can be omitted if the DBD controller 120 loads all flip-flops 404 before any activation.

In some examples, the fire data flip-flop 404 stores one bit of data, which when set to "1" enables activation of a fluidic actuator of primitive n, and when set to "0" disables activation of a fluidic actuator in primitive n.

In other examples, the storage element 404 can be implemented with a different type of storage.

Although not shown, the fluid dispensing device 102 can include multiple levels of memory, including a higher-level memory and lower-level memory. The fire data to the storage element 404 is provided from the lower-level memory. Fire data in the higher-level memory can be loaded into the lower-level memory. Also, the fire data in the higher-level memory can be shifted down a shift chain of the higher-level memory elements as a clock (e.g., Shift-Clk1 or a different clock) cycles between active and inactive states. In other examples, multiple levels of memory to store fire data are not employed.

In the ensuing discussion, it is assumed that an active value of a signal or circuit node is logic "1", and that an inactive value of a signal or circuit node is logic "0".

However, in different implements, an active value can correspond to logic "0", while an inactive value can correspond to logic "1".

In each activation interval (e.g., an FPG), fire data is loaded into the storage element 404 for an individual fluidic actuator of primitive n. In the FPG arrangement, fire data is loaded on a per-primitive basis. Although primitive n includes multiple fluidic actuators (e.g., 8 fluidic actuators), the storage element 404 for primitive n stores the fire data for just one fluidic actuator, i.e., the fluidic actuator that is to be controlled for activation in the current FPG. New fire data is loaded into the storage element 404 for primitive n on each successive FPG.

The decoder portion 402 for primitive n also includes another storage element 406 to store DBD select data, which can be used to select whether or not a fluidic actuator of primitive n is to be subject to a DBD measurement. The storage element 406 is an example of the sense measurement storage element 204 of FIG. 2. The DBD select data controls values of sense measurement indicators stored in the storage elements 406. The DBD select data can be provided by the system controller 110 or by the DBD controller 120.

In some examples, the storage element 406 can be implemented as a flip-flop (referred to as "DBD select data flip-flop"), which has a D input to receive the DBD select data, a clock input to receive Shift-Clk2 (which is part of the control signals 124 from the DBD controller 120 of FIG. 1), and a C input to receive a Clear signal. The DBD select data flip-flop 406 has a Q output. In other examples, the Clear signal can be omitted if the DBD controller 120 loads all flip-flops 406 before any activation.

In the FPG arrangement, a DBD select data for an individual fluidic actuator is loaded on a per-primitive basis, similar to the loading of the fire data. Thus, for each primitive, there is just one DBD select data flip-flop 406. In some examples, the DBD select data is shifted along a series of DBD select data flip-flops 406 by the cycling of Shift-Clk2.

More generally, a value stored by the storage element 406 is an example of a sense measurement indicator that can be set to a value specifying that sense measurement is to be performed for a given primitive (FPG arrangement) or a given individual fluidic actuator (FCB arrangement).

The decoder portion 402 includes a DBD activate control logic 408 and a normal activate control logic 410. The DBD activate control logic 408 controls the activation of a fluidic actuator of primitive n that is to be subjected to a DBD measurement. The normal activate control logic 410 controls activation of a fluidic actuator of primitive n for the fluidic actuator that is not subjected to DBD measurement.

The DBD activate control logic 408 includes an AND gate 412 that receives as inputs the output of the storage element 404 and the output of the storage element 406. If both the fire data and the DBD select data are set to an active value (e.g., "1"), then the AND gate 412 outputs an active value that indicates that the corresponding fluidic actuator of primitive n is to be subjected to a DBD measurement. The output of the AND gate 412 is stored into a storage element 414 (e.g., implemented with a flip-flop) upon activation of a DBD Address Strobe provided to the clock input of the flip-flop 414. The output of the AND gate 412 being active indicates that the fluidic actuator selected by a current address (within primitive n) is scheduled to be activated based on the fluid control data 114, and that the primitive is selected for measurement.

The DBD Address Strobe is pulsed active for an address that selects a fluidic actuator that is to be subjected to a DBD measurement. The DBD Address Strobe is part of the control signals 124 provided by the DBD controller 120 of FIG. 1. More generally, a "sense address strobe" is pulsed active for an address that selects a fluidic actuator that is to be subjected to a sense measurement.

The flip-flop 414 is referred to as a DBD control flip-flop, and has a D input that receives the output of the AND gate 412, a clock input that receives the DBD Address Strobe, a C input that receives a Clear Delay Fire signal (also part of the control signals 124 from the DBD controller 120 of FIG. 1), and a Q output. The DBD control flip-flop 414 captures the state of the output of the AND gate 412 such that activation of the corresponding fluidic actuator that is to be subject to DBD measurement can be performed at the appropriate time (i.e., in the DBD FPG that is time shifted from the scheduled normal FPG). Effectively, the DBD control flip-flop 414 is set to an active value if a fluidic actuator in primitive n is selected for activation on the current address, and this fluidic actuator is selected for DBD measurement.

The Q output of the DBD control flip-flop 414 is provided to one input of an AND gate 416, and the other input of the AND gate 416 receives a DBD FPG Strobe. The DBD FPG Strobe is pulsed active during the DBD FPG depicted in FIG. 3. The DBD FPG Strobe is part of the control signals 124 provided by the DBD controller 120 of FIG. 1.

If both the inputs of the AND gate 416 are active (e.g., "1"), then the AND gate 416 outputs an active value to an input of an OR gate 418. Effectively, the AND gate 416 outputs an active value if the selected fluidic actuator (for the current address) is to be subjected to DBD measurement.

The other input of the OR gate 418 receives the output of the normal activate control logic 410. The OR gate 418 outputs an active value in response to either the DBD activate control logic 408 outputting an active value or the normal activate control logic 410 outputting an active value.

The output of the OR gate 418 is referred to as Qualified Fire Data, which is provided to inputs of fire AND gates 420-0, 420-1, ..., 420-7, assuming an example where each primitive includes 8 fluidic actuators.

In the normal activate control logic 410, a NAND gate 422 receives as inputs the DBD Address Strobe and the Q output of the DBD select data flip-flop 406.

The DBD Address Strobe is pulsed active for an address that selects a fluidic actuator that is to be subjected to a DBD measurement. Thus, if the DBD select data is set to an active value, and the DBD Address Strobe is pulsed active, the NAND gate 422 outputs an inactive value (e.g., "0"), which disables an AND gate 424 of the normal activate control logic 410 from activating its output. As a result, if a fluidic actuator of primitive n selected by a current address is to be subject to DBD measurement, the normal activate control logic 410 suppresses the activation of the fluidic actuator during the normal FPG, which allows the activation of the fluidic actuator to be activated in the DBD FPG by the DBD activate control logic 408.

On the other hand, if the DBD Select Data is set to an inactive value, or the DBD Address Strobe is not set to an active value, then the NAND gate 422 outputs an active value, which allows the AND gate 424 to output an active value if the fire data flip-flop 404 storing the fire data has an active value and the DBD FPG Strobe is not active, as detected by another input of the AND gate 424 through an inverter 426.

The AND gate 424 outputting an active value enables the activation of the fluidic actuator selected by the current address in a normal FPG.

The fire AND gates 420-0 to 420-7 also receive a Fire Pulse and outputs of respective address decoders 430-0 to 430-7. The Fire Pulse is generated by the system controller 110 or the DBD controller 120 or another controller (whether as part of the fluid dispensing device 102 or off the fluid dispensing device 102), and controls when fluidic actuators are activated. The pulse width of the Fire Pulse also may control an amount of energy provided to an activated fluidic actuator.

Each address decoder 430-$i$ ($i$=0 to 7) receives address signals, ADDR[m:0] (an example of 130 in FIG. 1), where m≥1 and depends on the number of fluidic actuators in each primitive. For example, if there are 8 fluidic actuators per primitive, then m≥2. In some examples, the address decoder 430-0 outputs an active value if the address signals ADDR [2:0] have value 000 (referred to as "A0"), the address decoder 430-1 outputs an active value if the address signals ADDR[2:0] have value 001 (referred to as "A1"), address decoder 430-2 outputs an active value if the address signals ADDR[2:0] have value 010 (referred to as "A2"), and so forth.

If all inputs of a fire AND gate 420-$i$ ($i$=0 to 7) are set active, then the fire AND gate 420-$i$ activates its output Fire Actuator $i$ signal, which is an activation signal to activate a corresponding fluidic actuator $i$ of primitive n. If the Fire Actuator $i$ signal is inactive, then the corresponding fluidic actuator $i$ of primitive n remains inactive.

In operation, to control activation of fluidic actuators of each primitive, the system controller 110 provides addresses A0 to A7 in corresponding normal FPGs in a given sequence, such as the sequence of FPGs of column group CG1 shown in FIG. 3. If a given normal FPG x (having a corresponding given address Ax) is for a given fluidic actuator x that is selected for DBD measurement, then the DBD Address Strobe is activated, so that activation of the given fluidic actuator x in the given normal FPG x is suppressed in the normal activate control logic 410.

Once the sequence of normal FPGs for respective addresses A0 to A7 have been processed, the DBD controller 120 activates the DBD FPG Strobe for the DBD FPG. The DBD controller 120 also sets the address of the DBD FPG to the address Ax (which is the address of fluidic actuator x that has been selected for DBD measurement). Upon the activation of the Fire Pulse, the fire AND gate 420-$x$ activates Fire Actuator x to activate the fluidic actuator x in the DBD FPG.

Figure 5:
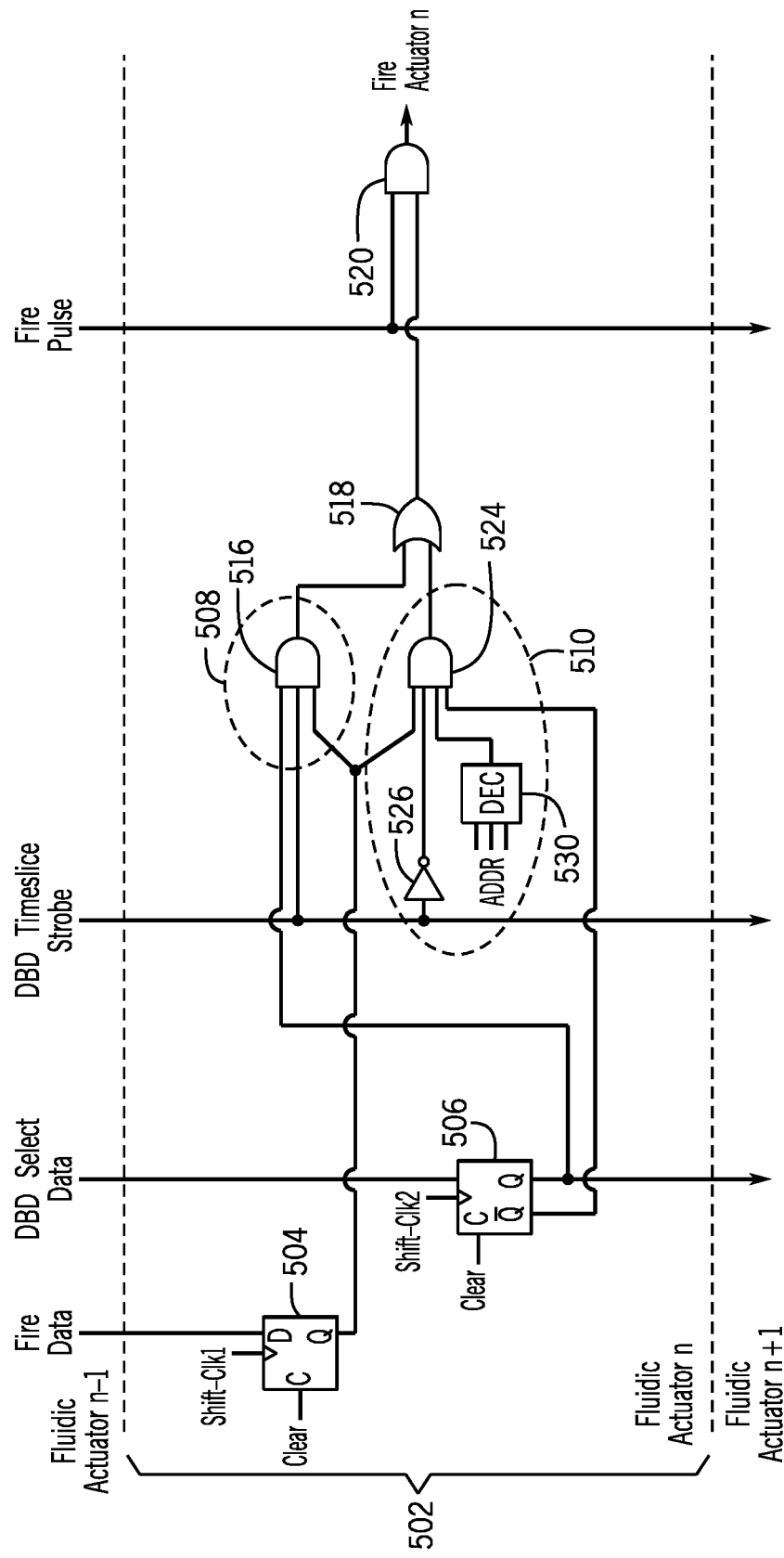

FIG. 5 shows a portion 502 of the decoder 122 according to the FCB arrangement. The decoder portion 502 is for controlling activation of fluidic actuator n. The logic of the decoder portion 502 is repeated for each of the other fluidic actuators of an array (e.g., column) of fluidic actuators.

Although specific gates (in the form of AND, OR, and NAND gates, inverters, and flip-flops) are shown implementing the decoder 122, it is noted that in other examples, similar logic can be implemented with other types of circuitry, such as an ASIC, PGA, and so forth. More generally, a "logic gate" as used herein can refer to an individual gate (e.g., an AND gate, an OR gate, an inverter, a NAND gate, etc.) or a combination of gates or any other circuitry used to implement a logic functionality.

The decoder portion 502 includes a storage element 504 for storing the fire data for fluidic actuator n, and a storage element 506 for storing the DBD select data for fluidic actuator n. According to the FCB arrangement, a corresponding pair of the storage elements 504 and 506 is individually associated with each of the fluidic actuators of the array of fluidic actuators.

Each of the storage elements 504 and 506 can be implemented as a flip-flop. In such implementations, the storage element 504 can be referred to a "fire data flip-flop 504," and the storage element 506 can be referred to as a "DBD select data flip-flop 506." In other examples, the storage element 504 and/or 506 can be implemented with a different type of storage.

The fire data flip-flop 504 stores data received at the D input on a transition of a clock (Shift-Clk1) that is provided to a clock input of the fire data flip-flop 504. A Clear signal is connected to a C input of the fire data flip-flop 504, and is used to clear the flip-flop 504 to an initial state (e.g., 0), and the output of the flip-flop 504 is represented as a Q output. The Shift-Clk1 and Clear signals are part of the control signals 124 from the DBD controller 120 of FIG. 1. The Clear signal can be activated by the DBD controller 120 to clear fire data from the fire data flip-flops 504. In other examples, the Clear signal can be omitted if the DBD controller 120 loads all flip-flops 504 before any activation.

In some examples, the fire data flip-flop 504 stores one bit of data, which when set to "1" enables activation of a fluidic actuator of primitive n, and when set to "0" disables activation of a fluidic actuator in primitive n.

Although not shown, the fluid dispensing device 102 can include multiple levels of memory, including a higher-level memory and lower-level memory. The fire data to the storage element 504 is provided from the lower-level memory. Fire data in the higher-level memory can be loaded into the lower-level memory. Also, the fire data in the higher-level memory can be shifted down a shift chain of the higher-level memory elements as a clock (e.g., Shift-Clk1 or a different clock) cycles between active and inactive states. In other examples, multiple levels of memory to store fire data are not employed.

In the ensuing discussion, it is assumed that an active value of a signal or circuit node is logic "1", and that an inactive value of a signal or circuit node is logic "0". However, in different implements, an active value can correspond to logic "0", while an inactive value can correspond to logic "1".

Fire data is loaded into the storage elements 504 for the respective fluidic actuators of an array of fluidic actuators.

The DBD select data flip-flop 506 has a D input to receive the DBD select data, which can be used to select whether or not the fluidic actuator n is to be subject to a DBD measurement. The DBD select data can be provided by the system controller 110 or by the DBD controller 120.

The DBD select data flip-flop 506 also has a clock input to receive Shift-Clk2 (which is part of the control signals 124 from the DBD controller 120 of FIG. 1), and a C input to receive a Clear signal. In other examples, the Clear signal can be omitted if the DBD controller 120 loads all flip-flops 506 before any activation.

The DBD select data flip-flop 506 has a Q output.

The DBD select data for the fluidic actuators of an array of fluidic actuators is loaded into respective DBD select data flip-flops. In some examples, the DBD select data is shifted along a series of DBD select data flip-flops 506 by the cycling of Shift-Clk2.

More generally, a value stored by the storage element 506 is an example of a sense measurement indicator that can be set to a value specifying that sense measurement is to be performed for a given individual fluidic actuator.

In FIG. 5, both the non-inverting (Q) output and inverting (Q) output of the DBD select data flip-flop 506 are shown. The non-inverting (Q) output of the DBD select data flip-flop 506 is provided to an input of an AND gate 516 of a DBD activate control logic 508 of the decoder portion 502. The DBD activate control logic 508 controls the activation of fluidic actuator n that is to be subjected to a DBD measurement.

The other inputs of the AND gate 516 of the DBD activate control logic 508 receive a DBD Timeslice Strobe and the output of the fire data flip-flop 504. The DBD Timeslice Strobe is part of the control signals 124 from the DBD controller 120 of FIG. 1. The DBD Timeslice Strobe is set active during the DBD activation interval of a column group. More generally, the DBD Timeslice Strobe is an example of a signal indicating that the fluid dispensing device is currently in the sense measurement interval.

Thus, if both the fire data and the DBD select data for fluidic actuator n are active, the AND gate 516 of the DBD activate control logic 508 sets its output active when the DBD Timeslice Strobe is activated during the DBD activation interval. More generally, the DBD activate control logic 508 enables the activation of fluidic actuator n in the DBD activation interval in response to the sense measurement indicator for fluidic actuator n being set active, the activate indicator for fluidic actuator n being set active, and a signal indicating the sense measurement interval.

Activation of the output of the AND gate 516 causes an OR gate 518 to activate its output that is provided to an input of a fire AND gate 520 that outputs a Fire Actuator n signal for controlling the firing of fluidic actuator n.

The decoder portion 502 also includes a normal activate control logic 510 that controls activation of fluidic actuator n that is not subjected to DBD measurement.

The other input of the OR gate 518 is connected to the output of an AND gate 524 of the normal activate control logic 510. If either the AND gate 516 or the AND gate 524 activates its output, the OR gate 518 activates its output. Effectively, the OR gate 518 activates an indication to fire fluidic actuator n if either the normal activate control logic 510 activates its output or the DBD activate control logic 508 activates its output.

The inputs of the AND gate 524 of the normal activate control logic 510 are connected to the following: the output of the fire data flip-flop 504; the inverting (Q) output of the DBD select data flip-flop 506; an inverted version (as inverted by an inverter 526) of the DBD Timeslice Strobe, and an output of an address decoder 530, which receives address lines ADDR (130 in FIG. 1). The output of the inverter 526 provides a signal indicating a non-sense measurement interval (i.e., the fluid dispensing device is not in a DVD activation interval).

The AND gate 524 of the normal activate control logic 510 is disabled from activating its output in response to either the DBD select data for fluidic actuator n being active (as stored by the DBD select data flip-flop 506), or the DBD Timeslice Strobe being active. Thus, the normal activate control logic 510 does not cause activation of fluidic actuator n if the DBD select data for fluidic actuator n is active, or during the DBD activation interval (as indicated by the DBD Timeslice Strobe).

If the address lines ADDR contain an address corresponding to fluidic actuator n, then the address decoder 530 activates its output to enable the AND gate 524 to activate its output if the fire data stored in the fire data flip-flop 504 is active, and the DBD select data flip-flop 506 stores an inactive value, and the fluid dispensing device 102 is not in a DBD time interval (i.e., DBD Timeslice Strobe is inactive).

The fire AND gate 520 also receive a Fire Pulse, along with the output of the OR gate 518. The Fire Pulse is generated by the system controller 110 or the DBD controller 120 or another controller (whether as part of the fluid dispensing device 102 or off the fluid dispensing device 102), and controls when fluidic actuators are activated. The pulse width of the Fire Pulse also may control an amount of energy provided to an activated fluidic actuator.

If all inputs of the fire AND gate 520 are set active, then the fire AND gate 520 activates its output Fire Actuator n signal, which is an activation signal to activate a corresponding fluidic actuator n. If the Fire Actuator n signal is inactive, then the corresponding fluidic actuator n remains inactive. Stated differently, if the fire AND gate 520 is enabled (i.e., the input of the fire AND gate 520 connected to the output of the OR gate 518 is active), then activation of the Fire Pulse causes the corresponding activation of the Fire Actuator n signal.

In operation, to control activation of fluidic actuators of each primitive, the system controller 110 provides addresses A0 to A7 in corresponding normal activation intervals of a column group. If a given normal activation interval x (having a corresponding given address Ax) is for a given fluidic actuator x that is selected for DBD measurement, then the DBD select data in the DBD select data flip-flop 506 is active, so that activation of the given fluidic actuator x in the given normal activation interval x is suppressed in the normal activate control logic 510.

Once the sequence of normal activation intervals for respective addresses A0 to A7 have been processed, the DBD controller 120 activates the DBD Timeslice Strobe for the DBD activation interval. Note that the address corresponding to the fluidic actuator x does not have to be provided to the DBD activate control logic 508 (the address is provided to normal activate control logic 510). Upon the activation of the Fire Pulse, the fire AND gate 520 activates Fire Actuator x to activate the fluidic actuator x in the DBD activation interval.

Figure 6A:
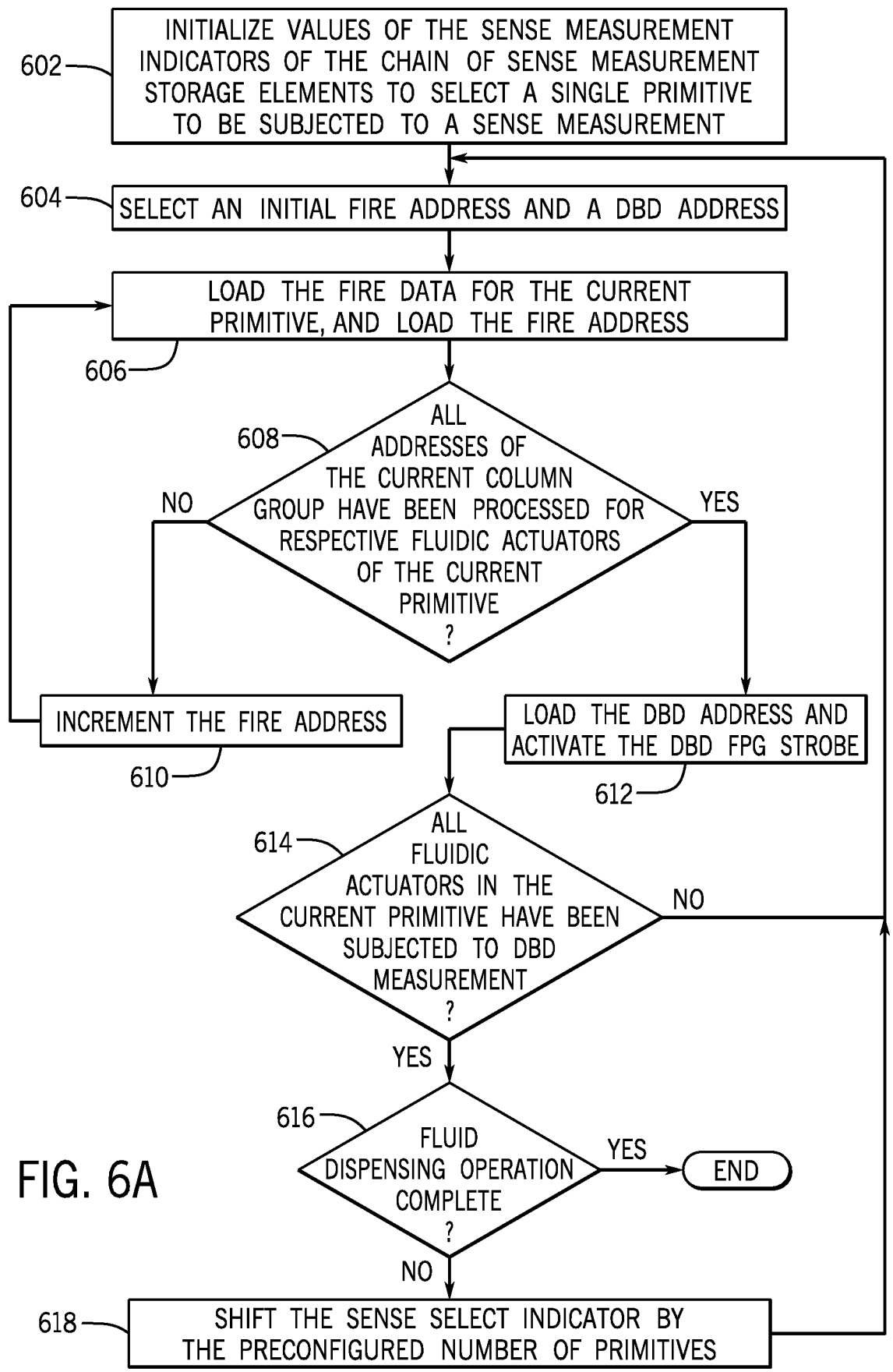
FIGS. 6A-6C are flow diagrams of processes of a controller according to various examples.
Figure 6B:
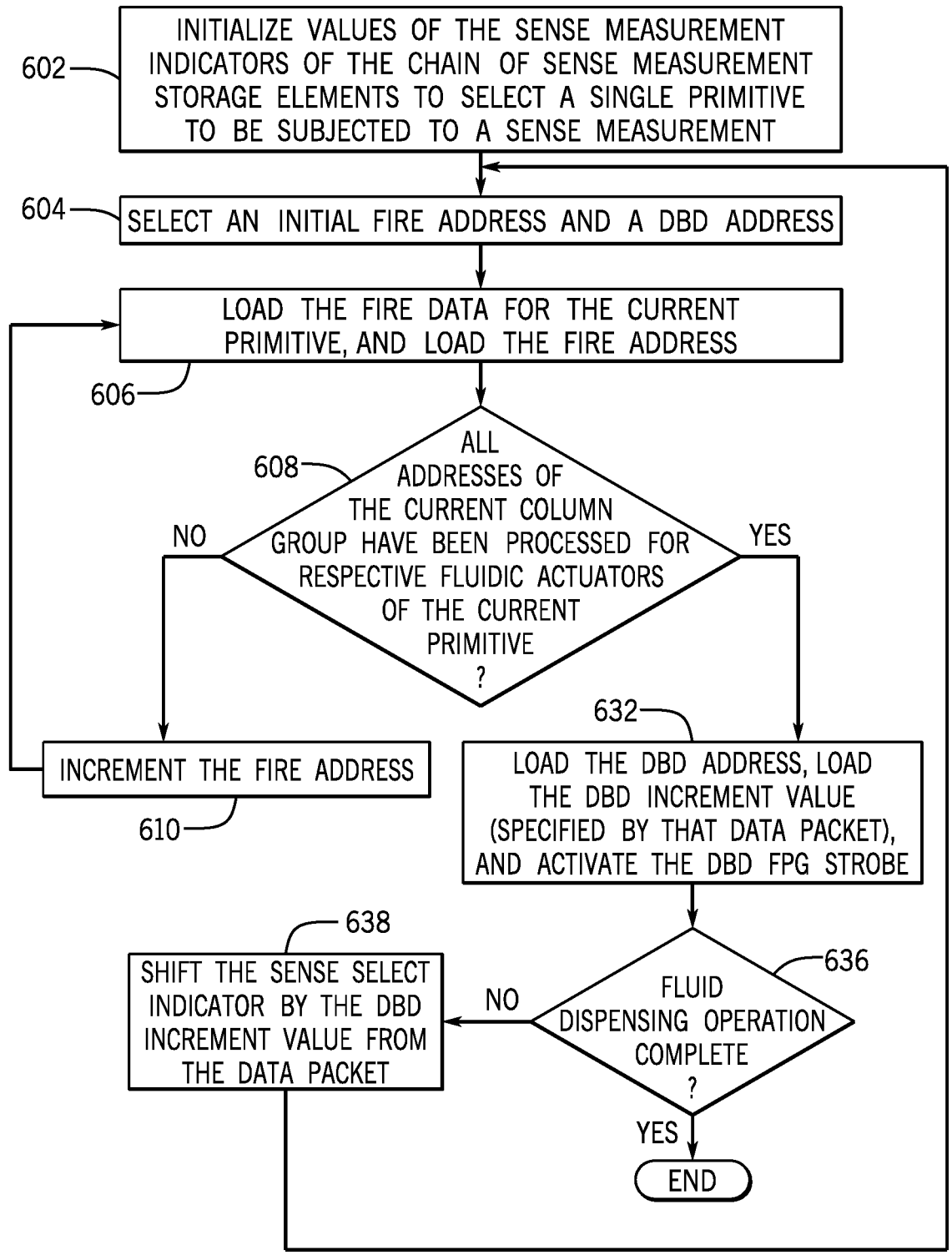
Figure 6C:
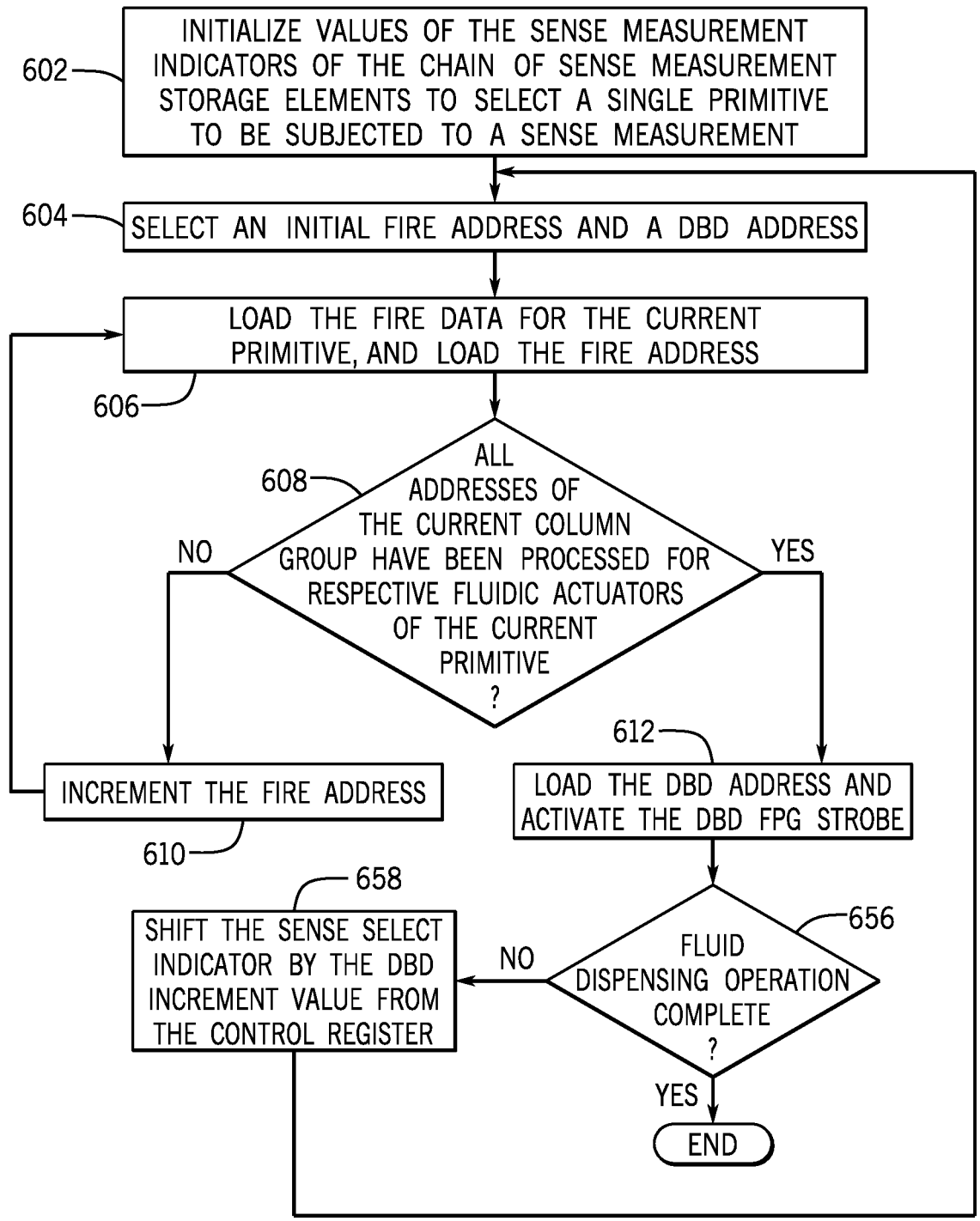

FIGS. 6A-6C show various processes performed for the FPG arrangement. The processes of FIGS. 6A-6C can be performed by a controller, such as the controller 206 of FIG. 2 or the DBD controller 120 of FIG. 1, for shifting a sense select indicator through the chain of sense measurement storage elements (e.g., 204 in FIG. 2 or 406 in FIG. 4).

It is noted that the tasks shown in FIGS. 6A-6C can be performed in an order different from the order shown.

In some examples, the chain of sense measurement storage elements 204 is a circular chain, such that upon the sense select indicator being shifted to the end of the circular chain, further shifting will cause the sense select indicator to wrap around to the beginning of the circular chain.

FIG. 6A shows a process in which the sense select indicator is shifted through the chain of sense measurement storage elements 204 by a preconfigured number (1 or greater than 1) of primitives. Assuming there are N primitives in an array (e.g., column) of fluidic actuators, then there are N sense measurement storage elements 204 in the chain. The preconfigured number of primitives by which the sense select indicator is shifted can be programmed into the controller.

The controller initializes (at 602) values of the sense measurement indicators of the chain of sense measurement storage elements 204 to select a single primitive to be subjected to a sense measurement. The selected primitive (and any subsequently selected primitive) is referred to as a "current primitive" in the ensuing discussion.

The controller selects (at 604) an initial fire address and a DBD address. The fire address is the address of a fluidic actuator in the current normal FPG that is to be selected for activation. As shown in FIG. 3, in a column group, M (e.g., 8) different fluidic actuators are selected for possible activation in M respective normal FPGs. In some examples, the initial fire address selected (at 604) is address A0 (or a different address).

The selected DBD address is the address of the fluidic actuator of the current primitive that is to be subjected to DBD measurement.

The controller loads (at 606) the fire data for the current primitive, and loads the fire address, which in the first iteration of the current column group is the initial fire address (selected at 604). Loading the fire data can refer to loading the fire data into the fire data flip-flop 404 of FIG. 4, for example. Loading the fire address can refer to providing the fire address to the decoder portion 402 of FIG. 4.

Once the fire data and the fire address have been loaded, then upon activation of the Fire Pulse (FIG. 4), the fluidic actuator selected by the loaded fire address is activated in the current normal FPG (if the loaded fire data has an active value) or maintained inactive (if the loaded fire data has an inactive value or if the loaded fire address is the selected DBD address).

The controller next determines (at 608) whether all addresses of the current column group have been processed for respective fluidic actuators of the current primitive. If not, the controller increments (at 610) the fire address, and proceeds to the next iteration of the current column group.

In the next iteration, the controller loads new fire data and the incremented fire address (at 606), to perform fluidic actuator activation control in the next normal FPG of the current column group.

If all addresses in the current column group have been processed in respective normal FPGs of the current column group, the fluid dispensing device proceeds to the DBD FPG. Note that for a given fluidic actuator associated with the selected DBD address (as selected at 604), the given fluidic actuator is not activated in the normal FPG, but rather would be activated in the DBD FPG.

The controller proceeds to task 612, to load the DBD address and activate the DBD FPG Strobe (FIG. 4), to cause activation of the given fluidic actuator in the DBD FPG of the current column group for performing a DBD measurement of the given fluidic actuator. Loading the DBD address can refer to providing the DBD address to the address decoders (e.g., 430-0 to 430-7 in FIG. 4).

The controller next determines (at 614) if all fluidic actuators in the current primitive have been subjected to DBD measurement. If not, the process returns to task 604, where the controller selects an initial fire address and selects another DBD address of another fluidic actuator of the current primitive to be subjected to DBD measurement.

If all fluidic actuators in the current primitive have been subjected to DBD measurement, the controller determines (at 616) whether a fluid dispensing operation (e.g., a print operation) is complete. If so, the process of FIG. 6A ends. However, if the fluid dispensing operation is not yet complete, the controller shifts (at 618) the sense select indicator by the preconfigured number of primitives (e.g., 1 primitive or multiple primitives), and the process returns to task 604 for the next primitive.

FIG. 6B shows a process in which the sense select indicator is shifted through the chain of sense measurement storage elements 204 by a specified number of primitives as indicated in a data packet that contains fire data. The data packet is provided by the system controller 110 to the fluid dispensing device 102 (FIG. 1).

In some examples, the specified number for shifting the sense select indicator can be included in a header of the data packet, or alternatively, in a payload of the data packet. This specified number is referred to as a "DBD increment value" in the ensuing discussion.

Task 602, 604, 606, 608, and 610 in FIG. 6B are similar to corresponding tasks of FIG. 6A.

In FIG. 6B, after all addresses in the current column group have been processed, the controller loads (at 632) the DBD address, loads the DBD increment value (specified by the data packet), and activates the DBD FPG Strobe, to cause activation of the given fluidic actuator in the DBD FPG of the current column group for performing a DBD measurement of the given fluidic actuator. The DBD increment value is retrieved from the data packet and stored in a temporary storage (e.g., a buffer, a register, etc.).

Next, the controller determines (at 636) whether the fluid dispensing operation is complete. If so, the process of FIG. 6B ends. However, if the fluid dispensing operation is not yet complete, the controller shifts (at 638) the sense select indicator by the DBD increment value loaded from the data packet (at 632), and the process returns to task 604 to perform the sense measurement for the next primitive based on the shifting by the DBD increment value.

FIG. 6C shows a process in which the sense select indicator is shifted by a number of primitives based on a value ("DBD increment value") contained in the control register 132 (FIG. 1). Tasks 602, 604, 606, 608, 610, and 612 in FIG. 6C are similar to corresponding tasks in FIG. 6A.

After task 612, the controller determines (at 656) whether the fluid dispensing operation is complete. If so, the process of FIG. 6C ends. If not, the controller shifts (at 658) the sense select indicator by the DBD increment value contained in the control register 132, and the process returns to task 604 to perform sense measurement of the next primitive.

Figure 7A:
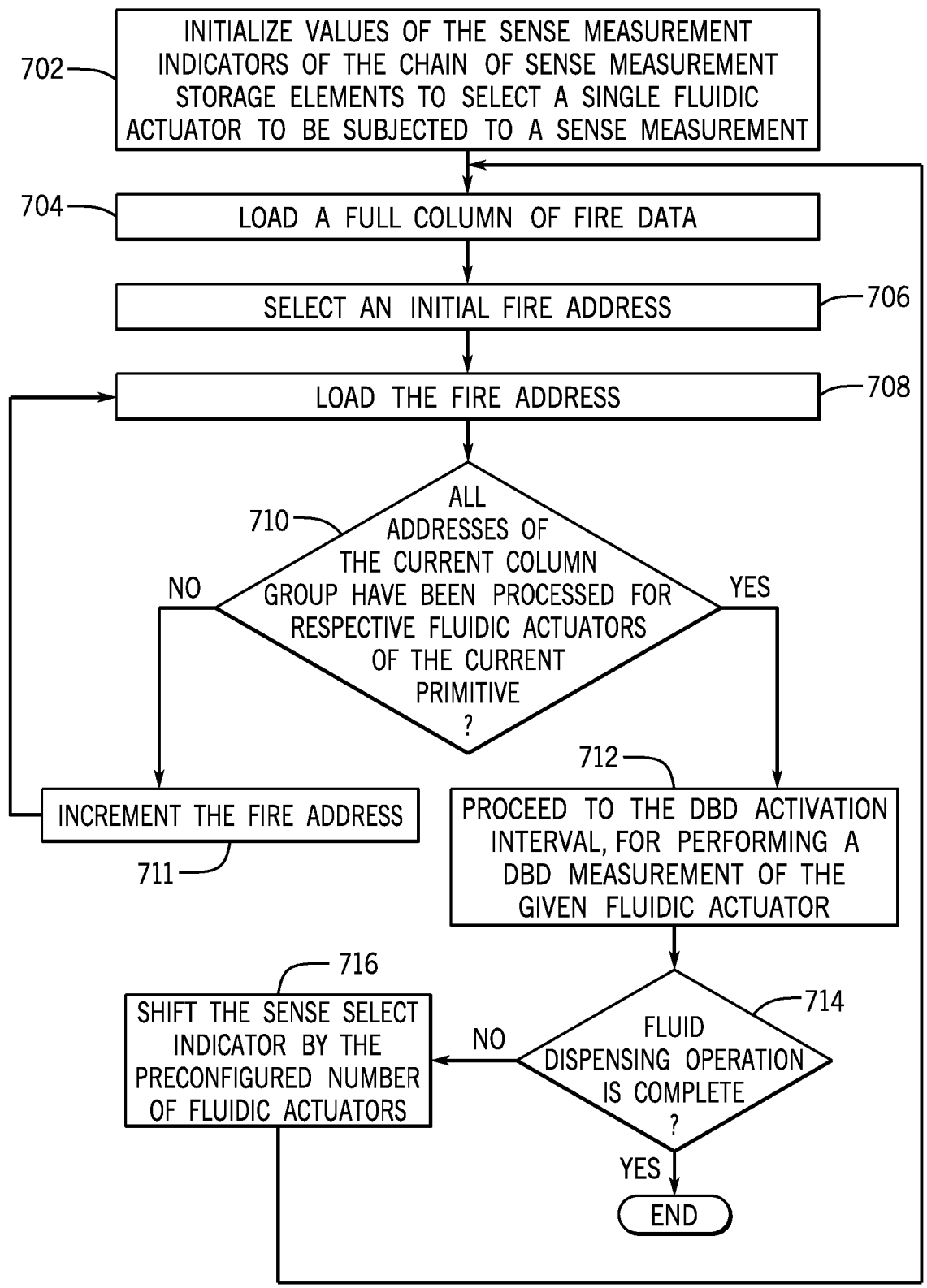
FIGS. 7A-7C are flow diagrams of processes of a controller according to alternative examples.
Figure 7B:
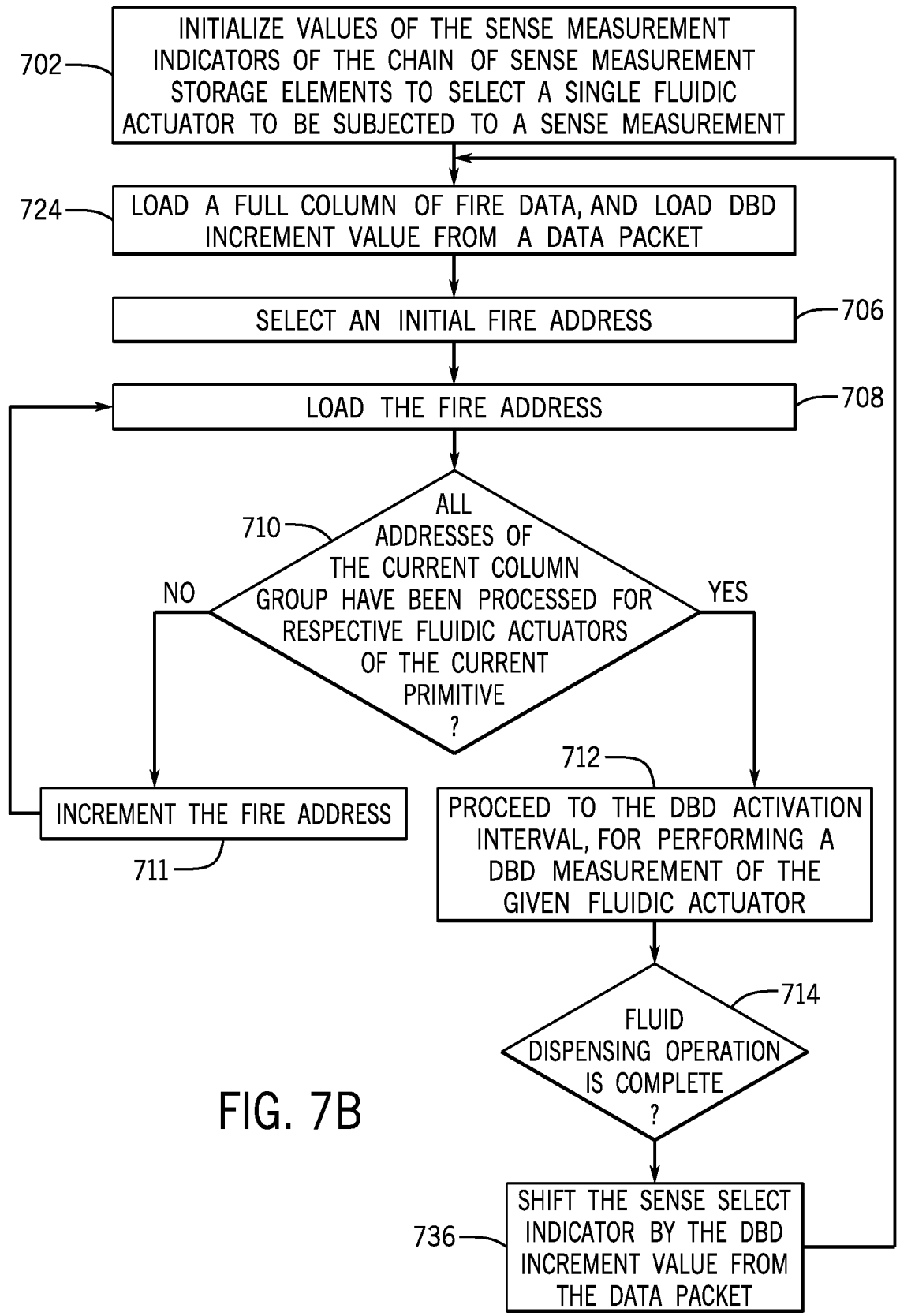
Figure 7C:
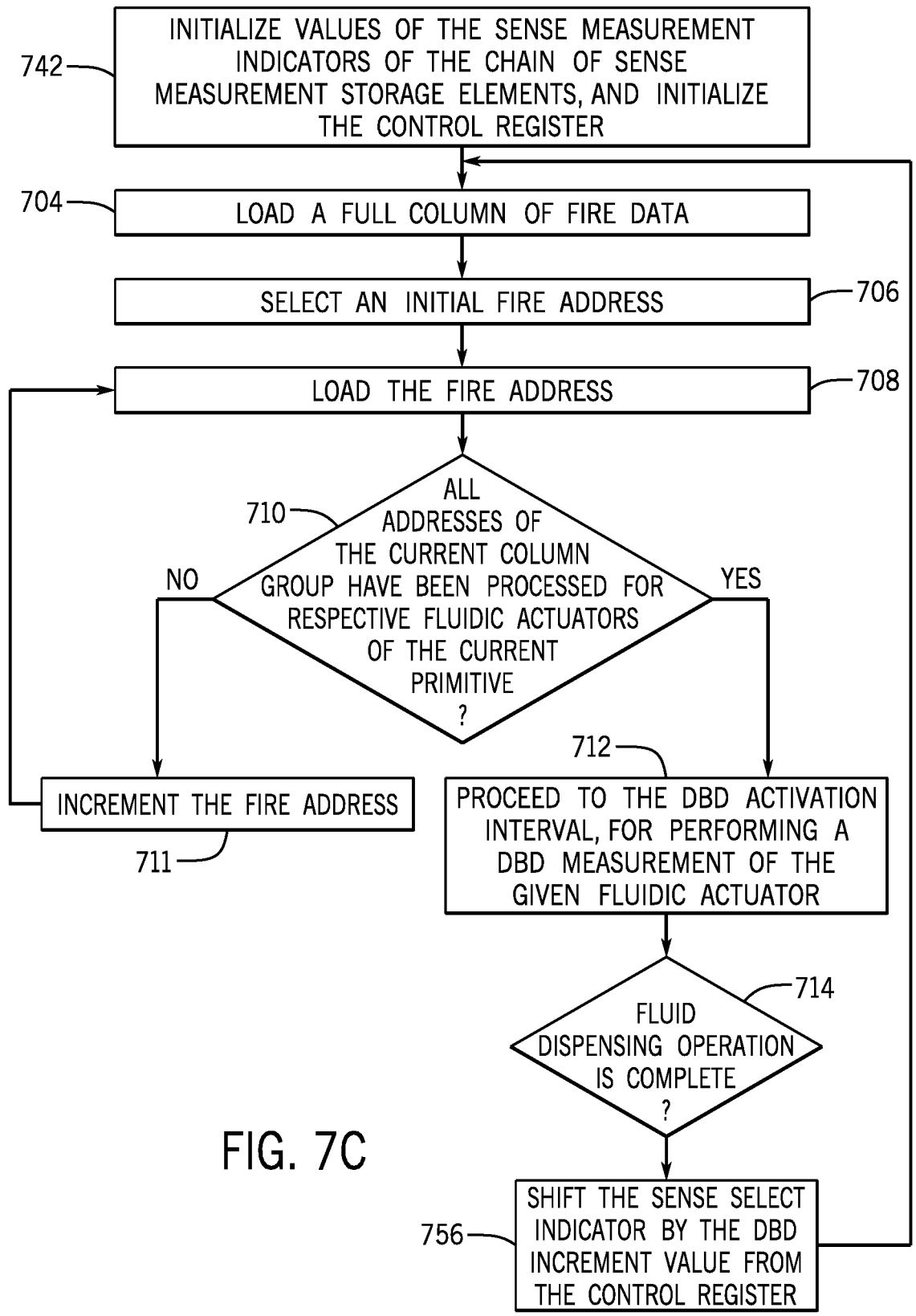

FIG. 7A-7C illustrate processes for shifting a sense select indicator through the chain of sense measurement storage elements (204 in FIG. 2 or 506 in FIG. 5) according to the FCB arrangement. The processes of FIGS. 7A-7C can be performed by a controller, such as the controller 206 of FIG. 2 or the DBD controller 120 of FIG. 1.

It is noted that the tasks shown in FIGS. 7A-7C can be performed in an order different from the order shown.

FIG. 7A shows a process in which the sense select indicator is shifted through the chain of sense measurement storage elements 204 by a preconfigured number (1 or greater than 1) of fluidic actuators.

The controller initializes (at 702) values of the sense measurement indicators of the chain of sense measurement storage elements 204 to select a single fluidic actuator to be subjected to a sense measurement.

The controller loads (at 704) a full column of fire data, such as into the fire data flip-flops 504 of FIG. 5.

The controller selects (at 706) an initial fire address.

The controller loads (at 708) the fire address, which in the first iteration of the current column group is the initial fire address (selected at 706). Once the fire address has been loaded, then upon activation of the Fire Pulse (FIG. 5), the fluidic actuator selected by the loaded fire address is activated in the current normal activation interval (if the loaded fire data in the corresponding fire data flip-flop 504 has an active value) or maintained inactive (if the corresponding fire data has an inactive value or if the corresponding sense measurement indicator in the respective sense measurement storage element 204 or the DBD select data flip-flop 506 is active).

The controller next determines (at 710) whether all addresses of the current column group have been processed for respective fluidic actuators of the current primitive. If not, the controller increments (at 711) the fire address, and proceeds to task 708 for the next iteration of the current column group.

If all addresses in the current column group have been processed in respective normal activation intervals of the current column group, the fluid dispensing device proceeds to the DBD activation interval. Note that for a given fluidic actuator that is to be subjected to DBD measurement (based on the corresponding sense measurement storage element 204 or DBD select data flip-flop 506 being active), the given fluidic actuator is not activated in the normal activation interval, but rather would be activated in the activation interval.

The controller proceeds (at 712) to the DBD activation interval, during which the given fluidic actuator is activated for performing a DBD measurement of the given fluidic actuator.

The controller next determines (at 714) whether a fluid dispensing operation is complete. If so, the process of FIG. 7A ends. However, if the fluid dispensing operation is not yet complete, the controller shifts (at 716) the sense select indicator by the preconfigured number of fluidic actuators (e.g., 1 fluidic actuator or multiple fluidic actuators), and the process returns to task 704 for the next fluidic actuator.

FIG. 7B shows a process in which the sense select indicator is shifted through the chain of sense measurement storage elements 204 by a specified number of fluidic actuators as indicated in a data packet that contains fire data. The data packet is provided by the system controller 110 to the fluid dispensing device 102 (FIG. 1).

In some examples, the specified number for shifting the sense select indicator can be included in a header of the data packet, or alternatively, in a payload of the data packet. This specified number is referred to as a "DBD increment value" in the ensuing discussion.

Task 702, 706, 708, 710, 711, 712, and 714 in FIG. 7B are similar to corresponding tasks of FIG. 7A.

In the process of FIG. 7B, after task 702, the controller loads (at 724) a full column of fire data, such as into the fire data flip-flops 504 of FIG. 5, and further loads the DBD increment value from a data packet.

If the controller determines (at 714) that the fluid dispensing operation is not yet complete, the controller shifts (at 736) the sense select indicator by a number of fluidic actuators indicated by the DBD increment value obtained from the data packet, and the process returns to task 724 for the next fluidic actuator.

FIG. 7C shows a process in which the sense select indicator is shifted by a number of fluidic actuators based on a value ("DBD increment value") contained in the control register 132 (FIG. 1). Tasks 704, 706, 708, 710, 711, 712, and 714 in FIG. 7C are similar to corresponding tasks in FIG. 7A.

In task 742, the controller initializes values of the sense measurement indicators of the chain of sense measurement storage elements 204 to select a single fluidic actuator to be subjected to a sense measurement. Also, in task 742, the controller initializes the control register 132 with the DBD increment value, such as in response to a value received from the system controller 110.

If the controller determines (at 714) that the fluid dispensing operation is not complete, the controller shifts (at 756) the sense select indicator by the DBD increment value (by a number of fluidic actuators specified by the DBD increment value) contained in the control register 132, and the process returns to task 704 to perform sense measurement of the next fluidic actuator.

FIGS. 6A-6C and 7A-7C describe examples of how a controller can control shifting of a sense select indicator through a chain of sense measurement storage elements.

Figure 8A:
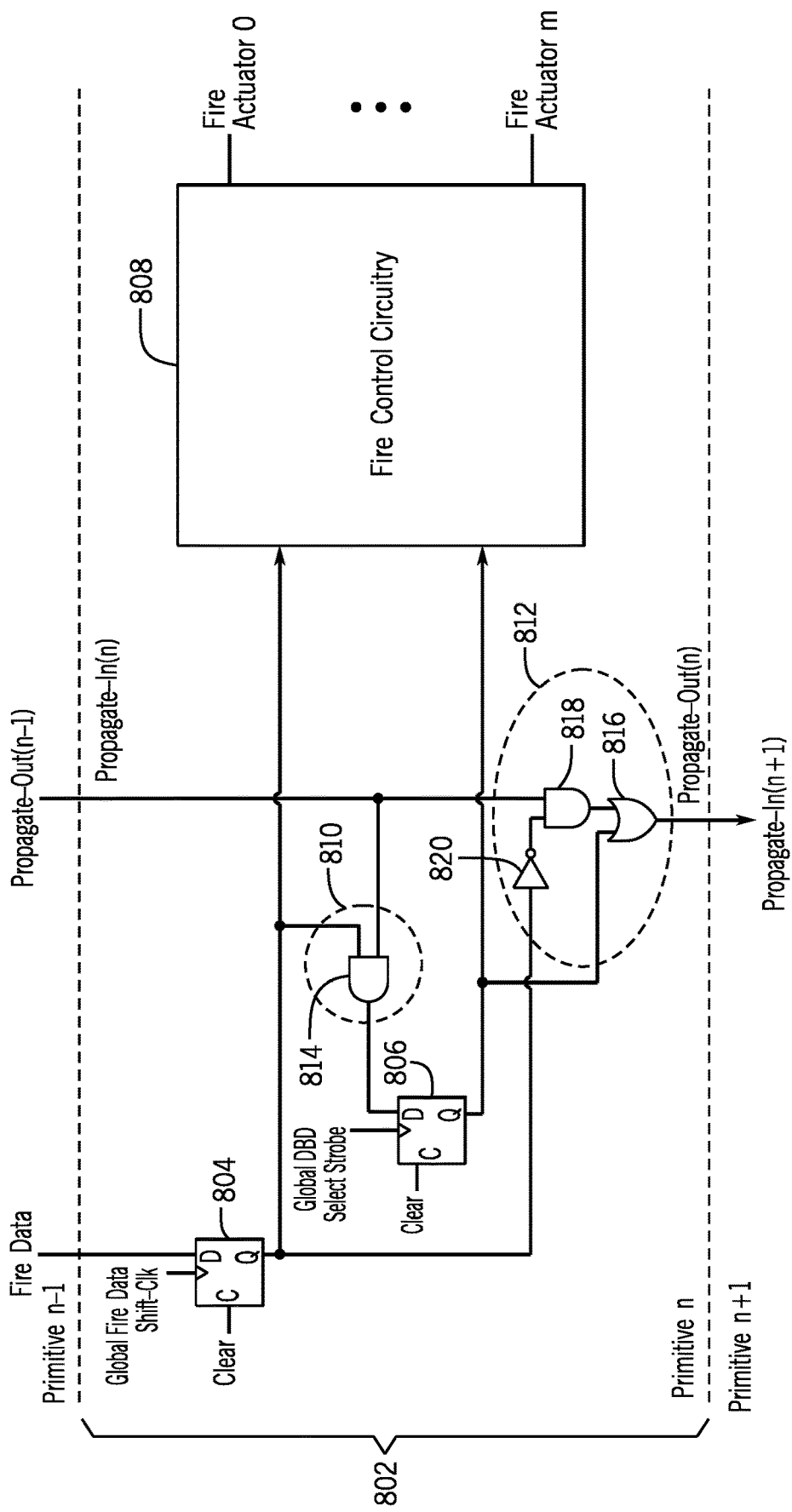
FIG. 8A is a schematic diagram of a decoder according to additional examples.

FIG. 8A show alternative implementations of the present disclosure where shift control logic in the decoder 122 is used in cooperation with a controller (e.g., the DBD controller 120 of FIG. 1 or the controller 206 of FIG. 2) to shift a sense select indicator through a chain of sense measurement storage elements.

The shift control logic in the decoder 122 automatically advances the sense select indicator to the next primitive (for the FPG arrangement) or to the next fluidic actuator (for the FCB arrangement), after an activation of a current fluidic actuator has been completed, and the fluid dispensing device 102 is ready for activation of the next fluidic actuator. In response to determining that the fire data for a fluidic actuator or a primitive is active, a value of the sense select indicator at a respective point in the chain is loaded into a respective DBD select data flip-flop in the chain. However, in response to determining that the fire data for a fluidic actuator or a primitive is inactive, loading of a value of the sense select indicator at a respective point in the chain into a respective DBD select data flip-flop in the chain is prevented.

Triggered by a global signal, the sense select indicator cascades down the chain of sense measurement storage elements, checking each fire data flip-flop (e.g., 404 in FIG. 4 or 504 in FIG. 5) in sequence, starting with the next fire data flip-flop after the one associated with the previous DBD selection. If the fire data flip-flop is set active, then the associated DBD select data flip-flop is set active and no further fire data flip-flops are checked (and therefore, no other primitives or fluidic actuators selected for DBD measurement). If the fire data flip-flop is set inactive, then the next fire data flip-flop in the chain is checked, with the checking continuing down the chain until a fire data flip-flop is found with the fire data set active.

FIG. 8A shows a portion 802 of the decoder 122 according to alternative implementations, in which shift control logic is provided in the decoder portion 802 to cooperate with control signals from the DBD controller 120 (or 206) to shift a sense select indicator through a chain of sense measurement storage elements (204 in FIG. 2 or 406 in FIG. 4). The circuitry shown in FIG. 8A is for the FPG arrangement. The decoder portion 802 is for a respective primitive n. The same decoder portion 802 is repeated for the other primitives.

The decoder portion 802 includes a fire data storage element 804 and a DBD select data storage element 806, which can be implemented as respective flip-flop similar to those depicted in FIG. 4, according to some examples.

The flip-flops 804 and 806 are arranged similarly to the respective flip-flops 404 and 406 of FIG. 4, except that a Global Fire Data Shift-Clk is provided to a clock input of the fire data flip-flop 804, and a Global DBD Select Strobe is provided to the clock input of the DBD select data flip-flop 806. The Global Fire Data Shift-Clk and the Global DBD Select Strobe are provided as part of the control signals 124 from the DBD controller 120.

The decoder portion 802 also includes fire control circuitry 808 for primitive n, which can include circuitry similar to those shown in FIG. 4, including the DBD activate control logic 408, the normal activate control logic 410, the OR gate 418, the address decoders 430-0 to 430-7, and the fire AND gates 420-0 to 420-7. The fire control circuitry 808 outputs Fire Actuator 0 to Fire Actuator m (m>1) signals, where m represents a number of fluidic actuators in a primitive.

In addition, the decoder portion 802 includes a DBD select set logic 810 and a DBD select propagate logic 812 according to some examples. The DBD select set logic 810 and the DBD select propagate logic 812 are part of the shift control logic noted above.

The DBD select set logic 810 includes an AND gate 814 and controls the value provided to the D input of the DBD select data flip-flop 806. The output value provided by the AND gate 814 of the DBD select set logic 810 is based on a value of a Propagate signal that is connected through the chain of DBD select data flip-flops 806.

The Propagate signal is an example of the select sense indicator discussed above. The Propagate signal is propagated through a propagation path that controls the setting of the chain of DBD select data flip-flops 806.

The Propagate signal output from the previous primitive n−1 is represented as Propagate-Out(n−1). The Propagate-Out(n−1) from the previous primitive n−1 is received as Propagate-In(n) signal by the shift control logic for primitive n. In addition, the shift control logic for primitive n can output a Propagate-Out(n) signal that propagates the select sense indicator to the next primitive n+1, which is received by the shift control logic of the next primitive n+1 as Propagate-In(n+1).

The AND gate 814 of the DBD select set logic 810 has inputs connected to the output of the fire data flip-flop 804 and the Propagate-In(n) signal. If the Propagate-Out(n−1) signal from the previous primitive n−1 has an inactive value (which indicates that the previous primitive n−1 is not selected for DBD measurement), then the AND gate 814 outputs an inactive value (e.g., "0") to the D input of the DBD select flip-flop 806.

However, if the Propagate-Out(n−1) signal from the previous primitive n−1 has an active value (e.g., "1"), and the fire data flip-flop 804 for primitive n stores an active value (e.g., "1"), then the AND gate 814 outputs an active value, which is loaded into the DBD select flip-flop 806 on a transition of the Global DBD Select Strobe from an inactive value to an active value. Setting the DBD select data flip-flop 806 to an active value causes a DBD measurement to be performed for a fluidic actuator of primitive n by the fire control circuitry 808, assuming that the fire data flip-flop 804 stores an active value.

Note that if the Propagate-Out(n−1) signal from the previous primitive n−1 has an active value (e.g., "1"), but the fire data flip-flop 804 for primitive n stores an inactive value (e.g., "0"), then the AND gate 814 outputs an inactive value so that the DBD select flip-flop 806 continues to store an inactive value.

The DBD select propagate logic 812 controls the propagation of the select sense indicator to the next primitive n+1. The DBD select propagate logic 812 includes an OR gate 816, which propagates an active value under either of two conditions: (1) the output of an AND gate 818 of the DBD select propagate logic 812 is active, or (2) the output of the DBD select flip-flop 806 is active.

The inputs of the AND gate 818 are connected to the Propagate-In(n) signal, and an inverted version of the output of the fire data flip-flop 804 (as inverted by an inverter 820 that is part of the DBD select propagate logic 812). Note that the inverter 820 can be omitted if the input of the AND gate 818 is connected to the inverting (Q) output of the fire data flip-flop 804.

If the Propagate-In(n) is inactive, then the output of the AND gate 818 is inactive.

Using the shift control logic of the decoder portion 802 for propagating the select sense indicator shown in FIG. 8A, the DBD select data flip-flop 806 of primitive n is loaded with an active value only if the corresponding fire data flip-flop 804 for primitive n also contains an active value. In examples where there is sparse activation of fluidic actuators (i.e., a number of fluidic actuators that are activated based on fire data is relatively low as a percentage of the total number of fluidic actuators), the shift control logic used in the decoder portion 802 allows for the select sense indicator to skip primitives for which the respective fire data is inactive. Rather than blindly advancing the sense select indicator into DBD select flip-flops 806 without regard to whether the corresponding fire data for a respective primitive is active, techniques or mechanisms using the shift control logic of FIG. 8A allows for a more intelligent loading of the sense select indicator into the next primitive that is to be activated.

More generally, the Propagate signal (an example of the select sense indicator) is cascaded down the chain of DBD select data flip-flops 806 in sequence with successive activations of the Global DBD Select Strobe. If the fire data flip-flop 804 for a particular primitive in the sequence is active, then the DBD select data flip-flop 806 for the particular primitive is also set active, so that a DBD measurement is performed for the particular primitive.

On the other hand, if the fire data flip-flop 804 for the particular primitive is set inactive, then the fire data flip-flop for the next primitive is checked until one is found with the fire data set to active.

Figure 8B:
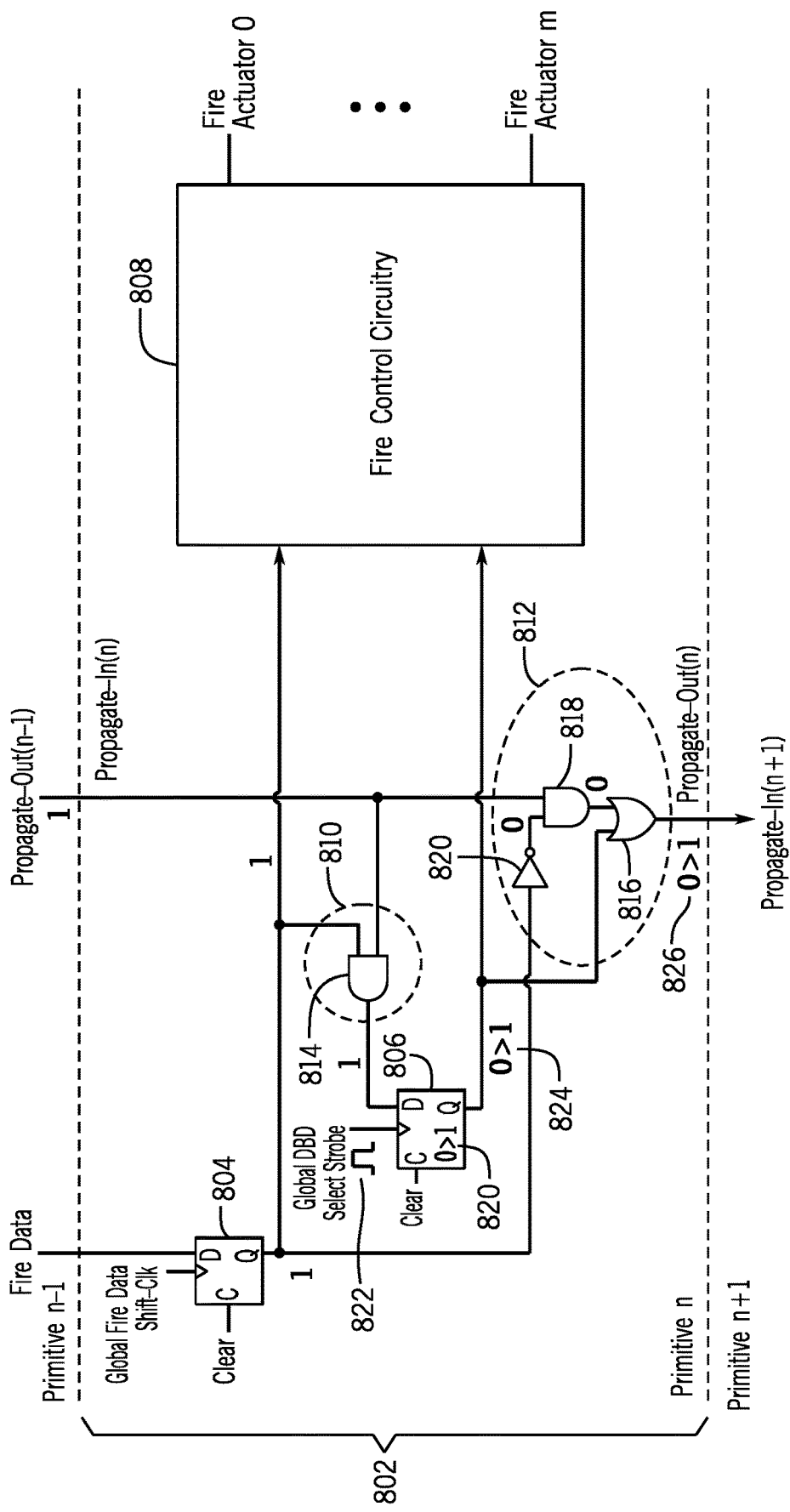
FIGS. 8B-8D are schematic diagrams of the decoder of FIG. 8A that show states of various logic gates according to various examples.

FIG. 8B shows an example that shows various states of the nodes of the decoder portion 802.

In the example of FIG. 8B, it is assumed that the fire data flip-flop 804 stores an active value, and the Propagate-Out (n−1) signal from the previous primitive n−1 is active. The active value of Propagate-Out(n−1) is provided as an active value to an input of the AND gate 814, which also receives the active value from the output of the fire data flip-flop 804. As a result, the AND gate 814 outputs an active value to the D input of the DBD select flip-flop 806. In the example of FIG. 8B, it is assumed that the DBD select data flip-flop 806 transitions from an inactive value to an active value (as indicated by 820) upon a transition of the Global DBD Select Strobe (indicated by 822). As a result of the loading of the DBD select data flip-flop 806 with an active value, the output of the DBD select data flip-flop 806 also transitions to an active value (as indicated by 824).

Since the fire data flip-flop 804 outputs an active value, the inverted version of this output is provided as an inactive value to an input of the AND gate 818. As a result, the AND gate 818 outputs an inactive value to an input of the OR gate 816.

The other input of the OR gate 816 receives the output of the DBD select flip-flop 806. Upon transition of the output of the DBD select flip-flop 806 to an active value (indicated by 824), the output of the OR gate 816 also transitions from an inactive value to an active value (indicated by 826). In this way, the setting of the DBD select data flip-flop 806 for primitive n to an active value causes propagation of an active Propagate-Out(n) signal to the next primitive n+1.

Figure 8C:
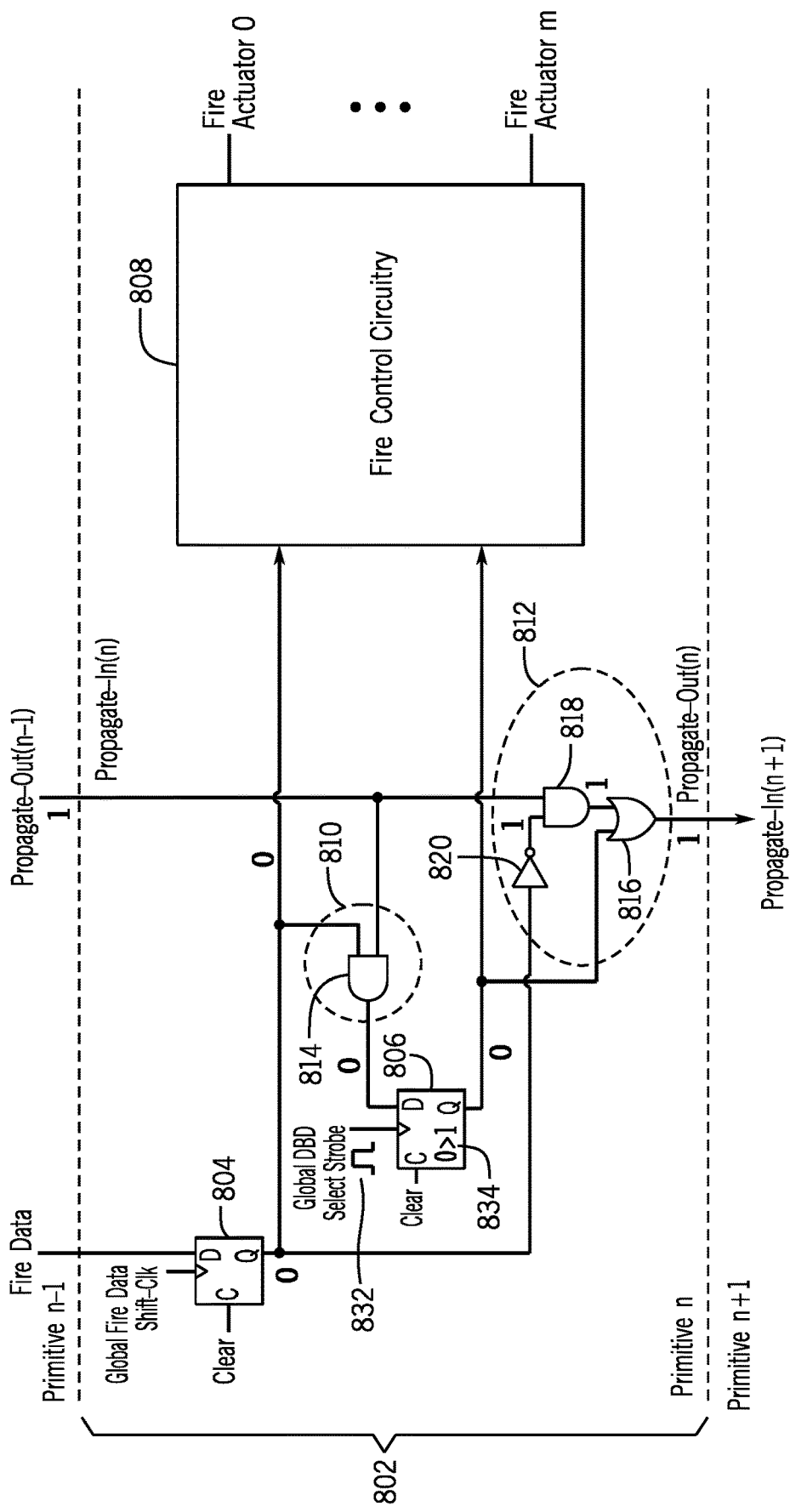

FIG. 8C shows an example where the fire data flip-flop 804 for primitive n has an inactive value, and the Propagate-Out(n−1) signal from the previous primitive n−1 is active. As a result of the inactive value of the fire data flip-flop 804, the AND gate 814 outputs an inactive value to the D input of the DBD select data flip-flop 806. On the transition of the Global DBD Select Strobe (as indicated by 832), the DBD select data flip-flop remains an inactive value (as indicated by 834). As a result, the output of the DBD select data flip-flop 806 is inactive, which is provided to an input of the OR gate 816.

Since the output of the fire data flip-flop 804 is inactive, the inverted version of this output is provided as an active value to the AND gate 818. Since the other input of the AND gate 818 is also active because Propagate-Out(n−1) is active, the AND gate 818 outputs an active value, which causes the OR gate 816 to output an active value to propagate to the next primitive n+1.

Figure 8D:
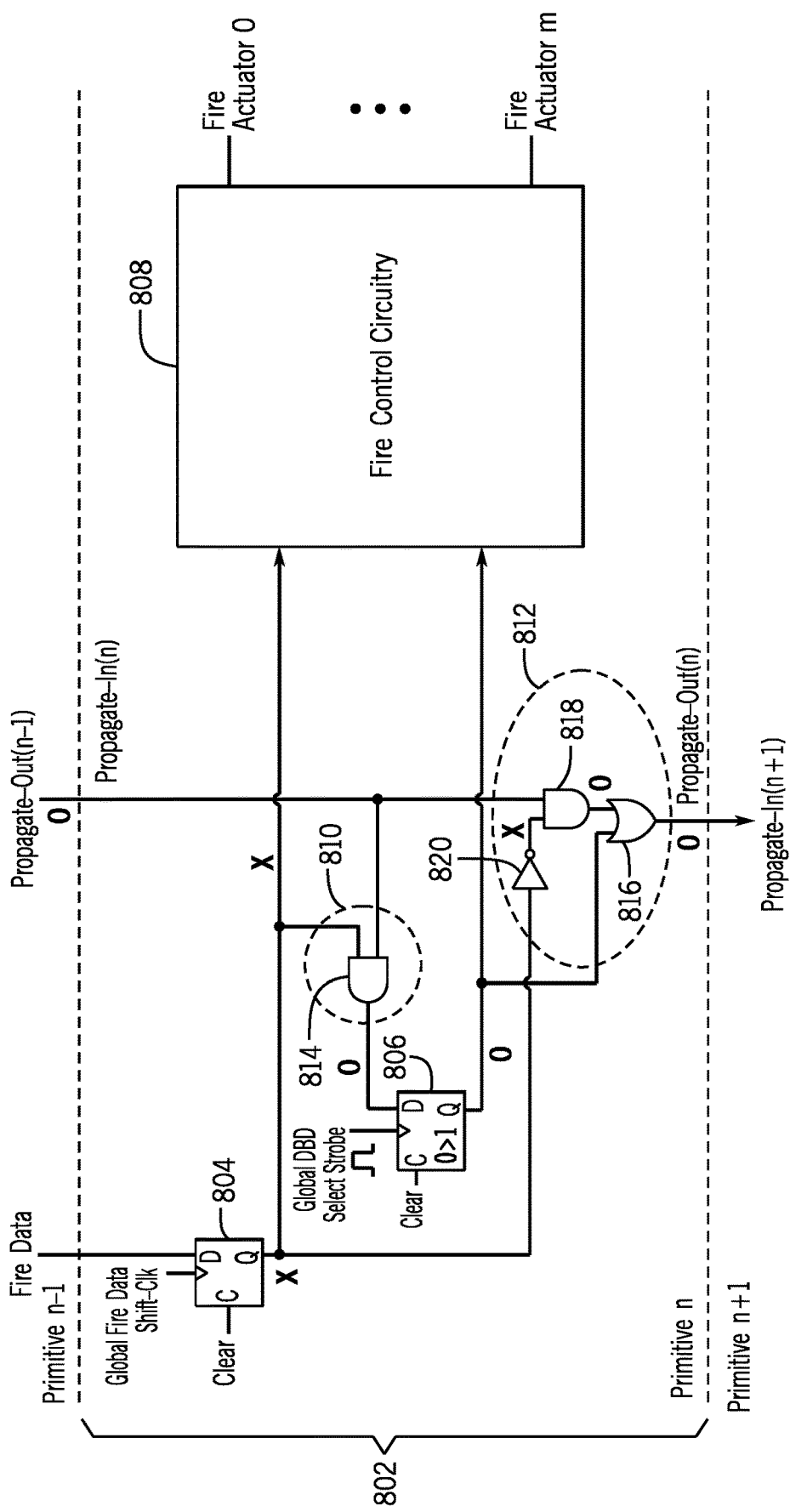

FIG. 8D shows an example where the Propagate-Out(n−1) signal from the previous primitive n−1 is inactive. As a result, the AND gate 814 outputs an inactive value, which causes the DBD select flip-flop 806 to stay at an inactive value and to output an inactive value. Nodes designated with "X" indicate that it does not matter what data state (active or inactive) those nodes are for the example operation in FIG. 8D.

The inactive value of Propagate-Out(n−1) causes the AND gate 818 to output an inactive value. As a result, both inputs of the OR gate 816 are inactive, which causes the OR gate 816 to output an inactive value so that an inactive value of the Propagate signal is propagated to the next primitive n+1. This can ensure that no additional DBD select flip-flops 806 will be set in the column, other than the one already set.

For the FCB arrangement, a decoder portion similar to the decoder portion 802 of FIG. 8a can be used (including 804, 806, 810, and 812), except that the fire control circuitry 808 is replaced with the fire control circuitry shown in FIG. 5 for the FCB arrangement to control activation of an individual fluidic actuator. For the FCB arrangement, the logic 804, 806, 810, and 812 is repeated for each individual fluidic actuator.

Figure 9:
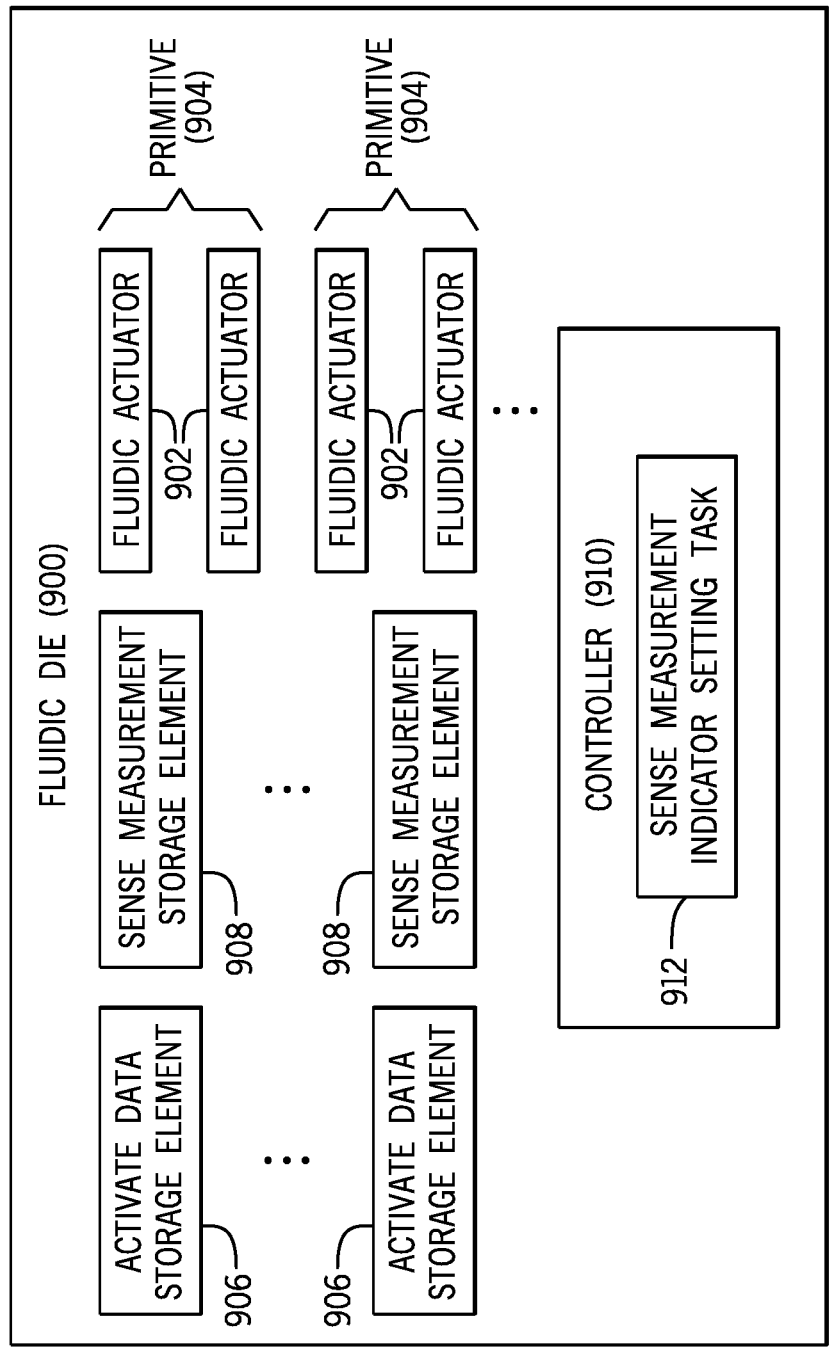
FIG. 9 is a block diagram of a fluidic die according to yet further examples.

FIG. 9 is a block diagram of a fluidic die 900 including a plurality of fluidic actuators 902 arranged as primitives 904 of fluidic actuators. The fluidic die 900 includes a plurality of activate data storage elements 906 to store activate data indicators to indicate whether or not respective fluidic actuators or primitives are to be enabled for activation. The fluidic die 900 further includes a plurality of sense measurement storage elements 908 to store sense measurement indicators to indicate whether or not respective fluidic actuators or primitives are to be subject to a sense measurement.

The fluidic die 900 further includes a controller 910 to perform a sense measurement indicator setting task 912 that controls setting of the sense measurement indicators in the sense measurement storage elements 908 to select which fluidic actuator is to be subject to a sense measurement.

Figure 10:
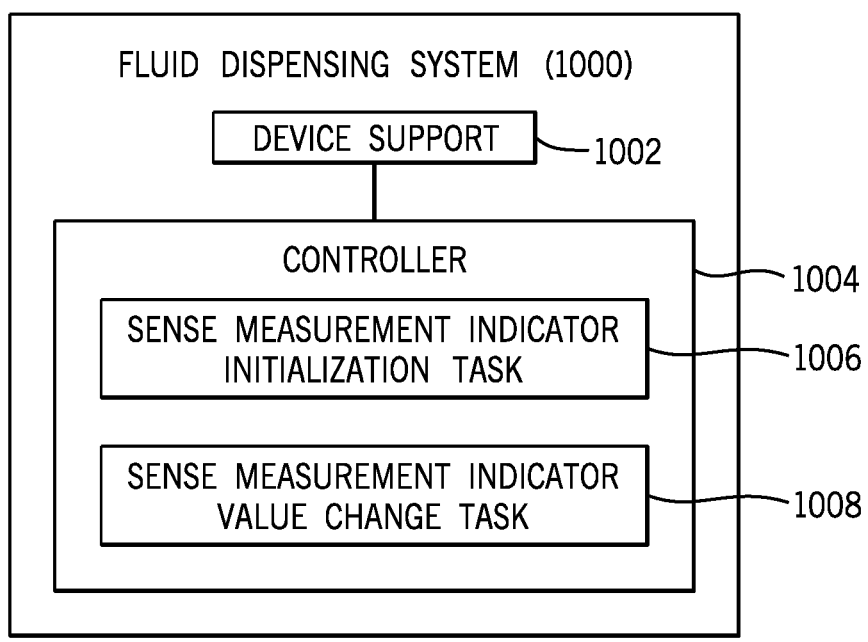
FIG. 10 is a block diagram of a fluid dispensing system including a controller according to alternative examples.

FIG. 10 is a block diagram of a fluid dispensing system 1000 including a device support 1002 to receive a fluid dispensing device comprising fluidic actuators and sense measurement storage elements to store sense measurement indicators that select fluidic actuators to be subject to a sense measurement.

The fluid dispensing system 1000 further includes a controller 1004 (e.g., system controller 110 in FIG. 1) to perform various tasks. The tasks of the controller 1004 include a sense measurement indicator initialization task 1006 to initialize values of sense measurement indicators in the sense measurement storage elements to select a fluidic actuator or group of fluidic actuators to be subject to a sense measurement, and a sense measurement indicator value change task 1008 to change the values of the sense measurement indicators in the sense measurement storage elements to select a different fluidic actuator or group of fluidic actuators to be subject to a sense measurement.

In examples where the system controller 110, DBD controller 120, the decoder 122 (FIG. 1), the controller 206 (FIG. 2), controller 910 (FIG. 9), or controller 1004 (FIG. 10) is implemented as a combination of a hardware processing circuit and machine-readable instructions, the controller or decoder can include a processor and a non-transitory machine-readable or computer-readable storage medium storing machine-readable instructions executable on the processor to perform respective tasks.

A processor can include a microprocessor, a core of a multi-core microprocessor, a microcontroller, a programmable integrated circuit, a programmable gate array, or another hardware processing circuit. Machine-readable instructions executable on a processor can refer to the instructions executable on a single processor or the instructions executable on multiple processors.

The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A fluid dispensing device comprising:
a plurality of fluidic actuators;
a chain of sense measurement storage elements to store sense measurement indicators for indicating whether sense measurement is to be performed for fluidic actuators of the plurality of fluidic actuators; and
a controller to:
control setting of the sense measurement indicators in the sense measurement storage elements to select which fluidic actuator is to be subject to a sense measurement, wherein the controller is to control setting of the sense measurement indicators in the sense measurement storage elements by shifting a sense select indicator through the chain of sense measurement storage elements.

2. The fluid dispensing device of claim 1, further comprising:
a propagate path to propagate the sense select indicator along the chain of sense measurement storage elements; and
a decoder to:
determine whether an activate data for a fluidic actuator or a group of fluidic actuators is active; and
in response to determining that the activate data for the fluidic actuator or the group of fluidic actuators is active, load a value of the sense select indicator at a respective point in the chain of sense measurement storage elements into a respective sense measurement storage element in the chain of sense measurement storage elements.

3. The fluid dispensing device of claim 1, wherein the plurality of fluidic actuators are arranged as primitives of fluidic actuators, each primitive of the primitives comprising multiple fluidic actuators, and
wherein the shifting of the sense select indicator through the chain of sense measurement storage elements causes selection of a different primitive of the primitives for sense measurement.

4. The fluid dispensing device of claim 1, wherein the plurality of fluidic actuators are arranged as primitives of fluidic actuators, each primitive of the primitives comprising multiple fluidic actuators, and
wherein the shifting of the sense select indicator through the chain of sense measurement storage elements causes selection of a different fluidic actuator for sense measurement.

5. The fluid dispensing device of claim 1, wherein the controller is to control setting of the sense measurement indicators in the sense measurement storage elements by shifting the sense select indicator through the chain of sense measurement storage elements by a specified number of sense measurement storage elements.

6. The fluid dispensing device of claim 1, wherein the controller is to control setting of the sense measurement indicators in the sense measurement storage elements by shifting the sense select indicator through the chain of sense measurement storage elements by a number of sense measurement storage elements specified in a data packet containing activate data for activation of fluidic actuators.

7. The fluid dispensing device of claim 1, further comprising a register to receive a shift value from a fluid dispensing system, wherein the controller is to control setting of the sense measurement indicators in the sense measurement storage elements by shifting the sense select indicator through the chain of sense measurement storage elements by the shift value of sense measurement storage elements specified in the register.

8. A fluid dispensing device comprising:
a plurality of fluidic actuators;
a chain of sense measurement storage elements to store sense measurement indicators for indicating whether sense measurement is to be performed for fluidic actuators of the plurality of fluidic actuators;
a controller to control setting of the sense measurement indicators in the sense measurement storage elements to select which fluidic actuator is to be subject to a sense measurement;
a propagate path to propagate a sense select indicator along the chain of sense measurement storage elements; and
a decoder to:
determine whether an activate data for a fluidic actuator or a group of fluidic actuators is active; and
in response to determining that the activate data for the fluidic actuator or the group of fluidic actuators is active, load a value of the sense select indicator at a respective point in the chain of sense measurement storage elements into a respective sense measurement storage element in the chain of sense measurement storage elements.

9. The fluid dispensing device of claim 8, wherein the decoder is to:
in response to determining that the activate data for the fluidic actuator or the group of fluidic actuators is inactive, prevent loading of the value of the sense select indicator at the respective point in the chain of sense measurement storage elements into a respective sense measurement storage element in the chain of sense measurement storage elements.

10. The fluid dispensing device of claim 8, wherein the loading of the value of the sense select indicator at the respective point in the chain of sense measurement storage elements into the respective sense measurement storage element in the chain of sense measurement storage elements is responsive to a control signal from the controller.

11. The fluid dispensing device of claim 8, wherein the propagate path comprises a plurality of points corresponding to respective different fluidic actuators or groups of fluidic actuators in the chain of sense measurement storage elements, and
wherein the decoder comprises a logic gate associated with a respective fluidic actuator or group of fluidic actuators to:
propagate an active value of the sense select indicator from a previous fluidic actuator or group of fluidic actuators in the chain of sense measurement storage elements to a next fluidic actuator or group of fluidic actuators in response to either:
an activate data for the respective fluidic actuator or group of fluidic actuators being inactive, or
the sense measurement storage element associated with the respective fluidic actuator or group of fluidic actuators storing an active value.

12. The fluid dispensing device of claim 11, wherein the logic gate is to:
block propagation of the active value of the sense select indicator from the previous fluidic actuator or group of fluidic actuators in the chain of sense measurement storage elements to the next fluidic actuator or group of fluidic actuators in response to:
the activate data for the respective fluidic actuator or group of fluidic actuators being active, and
the sense measurement storage element associated with the respective fluidic actuator or group of fluidic actuators storing an inactive value.

13. A fluidic die comprising:
a plurality of fluidic actuators arranged as primitives of fluidic actuators;
a plurality of activate data storage elements to store activate data indicators to indicate whether or not respective fluidic actuators or primitives are to be enabled for activation;
a chain of sense measurement storage elements to store sense measurement indicators to indicate whether or not respective fluidic actuators or primitives are to be subject to a sense measurement; and a controller to:
  control setting of the sense measurement indicators in the sense measurement storage elements to select which fluidic actuator is to be subject to a sense measurement, wherein the controlling comprises shifting a sense select indicator through the chain of sense measurement storage elements.

14. The fluidic die of claim 13, wherein the controlling comprises:
  propagating the sense select indicator using logic gates associated with respective fluidic actuators or primitives.

15. The fluidic die of claim 13, further comprising:
  a propagate path to propagate the sense select indicator along the chain of sense measurement storage elements; and
  a decoder to:
    determine whether an activate data for a fluidic actuator or a group of fluidic actuators is active; and
    in response to determining that the activate data for the fluidic actuator or the group of fluidic actuators is active, load a value of the sense select indicator at a respective point in the chain of sense measurement storage elements into a respective sense measurement storage element in the chain of sense measurement storage elements.

16. The fluidic die of claim 13, wherein the plurality of fluidic actuators are arranged as primitives of fluidic actuators, each primitive of the primitives comprising multiple fluidic actuators, and
  wherein the shifting of the sense select indicator through the chain of sense measurement storage elements causes selection of a different primitive of the primitives for sense measurement.

17. The fluidic die of claim 13, wherein the controller is to control setting of the sense measurement indicators in the sense measurement storage elements by shifting the sense select indicator through the chain of sense measurement storage elements by a number of sense measurement storage elements specified in a data packet containing activate data for activation of fluidic actuators.

18. The fluidic die of claim 13, further comprising a register to receive a shift value from a fluid dispensing system, wherein the controller is to control setting of the sense measurement indicators in the sense measurement storage elements by shifting the sense select indicator through the chain of sense measurement storage elements by the shift value of sense measurement storage elements specified in the register.

* * * * *